US010193465B2

United States Patent
Dai et al.

(10) Patent No.: US 10,193,465 B2
(45) Date of Patent: Jan. 29, 2019

(54) DC/DC CONVERSION APPARATUS

(71) Applicant: Murata Manufacturing Co., Ltd., Nagaokakyo-shi, Kyoto-fu (JP)

(72) Inventors: Jiale Dai, Shanghai (CN); Yu Cao, Shanghai (CN); Kezhi Wang, Shanghai (CN)

(73) Assignee: MURATA MANUFACTURING CO., LTD., Kyoto (JP)

( * ) Notice: Subject to any disclaimer, the term of this patent is extended or adjusted under 35 U.S.C. 154(b) by 146 days.

(21) Appl. No.: 15/279,777

(22) Filed: Sep. 29, 2016

(65) Prior Publication Data
US 2017/0093286 A1    Mar. 30, 2017

(30) Foreign Application Priority Data
Sep. 30, 2015    (CN) ............. 2015 1 0640478

(51) Int. Cl.
*H02M 3/338*    (2006.01)
*H02M 3/335*    (2006.01)
(Continued)

(52) U.S. Cl.
CPC ....... *H02M 3/338* (2013.01); *H02M 3/33569* (2013.01); *H02M 1/32* (2013.01);
(Continued)

(58) Field of Classification Search
CPC ........... H02M 1/32; H02M 2001/0032; H02M 2001/0058; H02M 3/33569; H02M 3/338
See application file for complete search history.

(56) References Cited

U.S. PATENT DOCUMENTS

| 5,442,540 A | 8/1995 | Hua et al. |
| 7,333,348 B2 * | 2/2008 | Horiuchi ........... H02M 3/33523 363/132 |

(Continued)

FOREIGN PATENT DOCUMENTS

| JP | 2002-191174 A | 7/2002 |
| JP | 2010-11625 A | 1/2010 |

(Continued)

OTHER PUBLICATIONS

Official Communication issued in corresponding Japanese Patent Application No. 2016-191313, dated Sep. 19, 2017.

*Primary Examiner* — Adolf Berhane
*Assistant Examiner* — Bart Iliya
(74) *Attorney, Agent, or Firm* — Keating & Bennett, LLP

(57) ABSTRACT

A DC/DC conversion apparatus includes a DC voltage source that outputs a DC power supply voltage, an oscillation circuit electrically connected to the DC voltage source, switch elements, a switch controller that connects or disconnects electrical connection between the DC voltage source and the oscillation circuit by switching turn-on and turn-off of the switch elements, and switches a direction of a voltage applied to the oscillation circuit between a first direction and a second direction, and a transformation circuit that outputs a current generated in the oscillation circuit and converts the current into a DC current. The switch controller disconnects the electrical connection between the oscillation circuit and the DC voltage source before the direction of the voltage applied to the oscillation circuit is switched from the first direction to the second direction, and connects the electrical connection between the oscillation circuit and the DC voltage source and switches the direction of the voltage applied to the oscillation circuit to the second direction after a current flowing through the oscillation circuit has been outputted to the transformation circuit.

17 Claims, 14 Drawing Sheets

(51) Int. Cl.
*H02M 1/32* (2007.01)
*H02M 1/00* (2006.01)
(52) U.S. Cl.
CPC ............... *H02M 2001/0032* (2013.01); *H02M 2001/0058* (2013.01); *Y02B 70/1491* (2013.01); *Y02B 70/16* (2013.01)

(56) References Cited

U.S. PATENT DOCUMENTS

| | | | |
|---|---|---|---|
| 2009/0059622 A1* | 3/2009 | Shimada | ................ H02M 1/32 363/17 |
| 2011/0194206 A1 | 8/2011 | Sase et al. | |
| 2012/0300502 A1 | 11/2012 | Shimada et al. | |
| 2015/0263646 A1* | 9/2015 | Hara | ...................... B60L 3/003 363/17 |
| 2015/0333634 A1 | 11/2015 | Yoshida et al. | |
| 2016/0344297 A1* | 11/2016 | Lee | ................... H02M 3/33584 |
| 2016/0352236 A1* | 12/2016 | Yoo | ................... H02M 3/33584 |

FOREIGN PATENT DOCUMENTS

| | | |
|---|---|---|
| JP | 2011-166949 A | 8/2011 |
| JP | 2011-167034 A | 8/2011 |
| JP | 2012-249375 A | 12/2012 |
| JP | 2014-180111 A | 9/2014 |
| WO | 2014/103105 A1 | 7/2014 |

\* cited by examiner

US 10,193,465 B2

DC/DC CONVERSION APPARATUS

CROSS REFERENCE TO RELATED APPLICATIONS

This application claims the benefit of priority to Chinese Patent Application No. 201510640478.5 filed on Sep. 30, 2015. The entire contents of this application are hereby incorporated herein by reference.

BACKGROUND OF THE INVENTION

1. Field of the Invention

The present invention relates to a DC/DC conversion apparatus that includes a LLC full-bridge circuit.

2. Description of the Related Art

In the prior art, a switch power supply is a power supply that utilizes a modern power electronic technology to control a ratio of a turn-on time and a turn-off time of a switch and maintain a stable output voltage, in which a DC/DC conversion apparatus, i.e., direct current-direct current conversion circuit, is a voltage transformer that effectively converts a DC input voltage into a fixed DC output voltage. Generally, the DC/DC conversion apparatus is divided into three types: a boost DC/DC transformer, a buck DC/DC transformer, and a boost-buck DC/DC transformer, and three types of control may be utilized according to requirements. Specifically, by utilizing energy storage characteristics of a capacitor and an inductor, high-frequency switching actions are performed by a controllable switch (MOSFET, etc.), inputted electric energy is stored in the capacitor or the inductor, and the electric energy is released to a load so as to provide energy when the switch is turned off. Its ability to output power or a voltage is related to a duty cycle, i.e., a ratio of a turn-on time of the switch and the entire cycle of the switch.

However, as the power electronic technology is developing rapidly, requirements, such as more high-frequency operation, high conversion efficiency, high power density, low noise and other requirements, have been proposed to a switch power supply.

FIG. 8 shows an existing DC/DC conversion apparatus 100 that includes a LLC full-bridge circuit. As shown in FIG. 8, the DC/DC conversion apparatus 100 includes a direct-current (DC) voltage source V10, four switch elements Q1~Q4, an oscillation circuit 20 including an inductor Lr and a capacitor Cr, and a transformation circuit 40 including a transformer 30 and a rectification circuit. In the DC/DC conversion apparatus 100, turn-on and turn-off of the individual switch elements Q1~Q4 are controlled, so as to control energy to be transmitted from a primary side Tr1 to secondary side Tr2 of the transformer 30.

For the individual switch elements Q1~Q4 in the DC/DC conversion apparatus 100 as shown in FIG. 8, their control sequences are shown in FIG. 9.

As shown in FIG. 9, a duty cycle of each switch element Q1~Q4 is 50%. At time t0, the switch elements Q1 and Q4 are turned on, the switch elements Q2 and Q3 are turned off, and a voltage Vc +− applied to the oscillation circuit 20 including the inductor Lr and the capacitor Cr is a positive value. At this moment, a current $I_{LLC}$ flowing through the oscillation circuit 20 is a positive value and increases gradually. Then, at time t1, the switch elements Q2 and Q3 are turned on and the switch elements Q1 and Q4 are turned off. At this moment, the voltage $Vc_{+-}$ applied to the oscillation circuit 20 instantly becomes a negative value because the voltage is varying intermittently. However, since the current is varying consecutively, as shown in FIG. 9, at time t1, when the voltage $Vc_{+-}$ applied to the oscillation circuit 20 instantly becomes a negative value, the current $I_{LLC}$ flowing through the oscillation circuit 20 is still a positive value although it decreases gradually. In other words, from time t1 (i.e., time of switching the switches) until a time of the current $I_{LLC}$ flowing through the oscillation circuit 20 being reduced to zero, the current $I_{LLC}$ flowing through the oscillation circuit 20 has a different phase from the voltage $Vc_{+-}$ applied to two terminals of the oscillation circuit 20. The result is that, since energy to be outputted to the secondary side Tr2 of the transformer 30 is a product of the voltage $Vc_{+-}$ and the current $I_{LLC}$, as shown in FIG. 9, the energy to be outputted to the secondary side of the transformer 30 is negative (i.e., the energy flows reversely from the oscillation circuit 20 to the DC voltage source V10) within a time period of A→B, and the energy will oscillate between the DC voltage source V10 and the oscillation circuit 20 after the time period of A→B. The oscillation between the DC voltage source V10 and the oscillation circuit 20 and a resistance present on a current path of the oscillation circuit 20 will result in an unnecessary loss.

Likewise, at time t2, the switch elements Q1 and Q4 are turned on and the switch elements Q2 and Q3 are turned off. At this moment, since the voltage is varying intermittently, the voltage $Vc_{+-}$ applied to the oscillation circuit 20 instantly becomes a positive value. However, since the current is varying consecutively, as shown in FIG. 9, at time t2, when the voltage Vc +− applied to the oscillation circuit 20 instantly becomes a positive value, the current $I_{LLC}$ flowing through the oscillation circuit 20 is still a negative value although it increases gradually. The result is that, as shown in FIG. 9, the energy to be outputted to the secondary side Tr2 of the transformer 30 is negative (i.e., the energy flows reversely from the oscillation circuit 20 to the DC voltage source V10) and oscillates between the DC voltage source V10 and the oscillation circuit 20 within a time period of C→D. A resistance present on the current path of the oscillation circuit 20 will result in an unnecessary loss.

In addition, a gain perspective should also be considered. Assume that a gain of the DC/DC conversion apparatus 100 is 1, switching frequencies of the individual switch elements Q1~Q4 in the DC/DC conversion apparatus 100 are equal to a resonance frequency of the oscillation circuit 20. At this moment, in an ideal state, a loss will not be generated in the DC/DC conversion apparatus 100. However, if the gain is less than 1, an input voltage Vin is certainly greater than an output voltage Vout. Since the duty cycles of the switch elements Q1~Q4 are 50%, $I_{LLC}$=Iout (i.e., the current $I_{LLC}$ flowing through the oscillation circuit 20 is equal to an output current) and input energy (i.e., a product of Vin and $I_{LLC}$) is certainly greater than output energy (i.e., a product of Vout and Iout). Wherein this extra portion (i.e., a value of Vin*$I_{LLC}$−Vout*Iout) has been consumed in the DC/DC conversion apparatus 100.

In other words, in the existing DC/DC conversion apparatus 100 as shown in FIG. 8, turn-on and turn-off of the individual switch elements Q1~Q4 are controlled by the duty cycle 50%, such that a portion of the energy flows reversely to the DC voltage source V10 and, thereafter, flows back and forth between the oscillation circuit 20 and the DC voltage source V10, which results in a loss and a reduced output power, such that the gain of the DC/DC conversion apparatus 100 also decreases, as shown in FIG. 9.

On the other hand, in the DC/DC conversion apparatus that includes a LLC full-bridge circuit, there is also a problem of a loss of a switch (i.e., a MOSFET). For the problem of switching loss, a soft-switching technology is usually utilized in the present technical field.

Soft-switching is in contrast to hard-switching. Generally, resonance is introduced before and after the process of the turn-on and the turn-off, such that a voltage before the switch is turned on is firstly reduced to zero and a current before the switch is turned off is firstly reduced to zero, which can eliminate an overlap of the voltage, the current during the turn-on and the turn-off and reduce their variance ratio so as to greatly reduce or even eliminate the switching loss. At the same time, a variation ratio of a voltage and a current of the switch during the turn-on and the turn-off is restricted by the resonance process, which significantly decreases the noise of the switch.

For the process of turn-off of the switch, an ideal soft turn-off process is such that the current is firstly reduced to zero and then the voltage increases slowly to an off-state value. At this moment, a turn-off loss of the switch is approximately zero. Since the current of the device before the turn-off has been reduced to zero, the problem of inductive turn-off has been solved. This is usually referred to as a zero current switch (ZCS). In addition, for the process of turn-on of the switch, an ideal soft turn-on process is such that the voltage is firstly reduced to zero and then the current increases slowly to an on-state value. At this moment, turn-on loss of the switch is approximately zero. Since the voltage of a junction capacitance of the device is also zero, the problem of capacitive turn-on has been solved. This is usually referred to as a zero voltage switch (ZVS).

In the prior art, in order to reduce the loss of the switch when it is turned on or even achieved the zero current switch (ZCS) and/or the zero voltage switch (ZVS), turn-on and turn-off sequences of the individual switch elements Q1~Q4 have to be adjusted appropriately.

SUMMARY OF THE INVENTION

Preferred embodiments of the present invention provide a DC/DC conversion apparatus, in which after all of the energy in an oscillation circuit has been transmitted to an output terminal, a voltage applied to the oscillation circuit is inverted. Thus, a phenomenon of energy reverse flow that results from energy flowing reversely from the oscillation circuit to the DC voltage source, which can inhibit energy loss in the DC/DC conversion apparatus, will not occur.

A preferred embodiment of the present invention provides a DC/DC conversion apparatus, in which when a gain of a voltage is invariable, the DC/DC conversion apparatus compensates for a decrease of a current due to a light load by adding a latency after all of the energy in an oscillation circuit has been transmitted to an output terminal, which decreases the gain such that the light load will not be damaged due to over-current when other conditions are all invariable.

Another preferred embodiment of the present invention provides a DC/DC conversion apparatus, in which before all of the energy in an oscillation circuit is transmitted to an output terminal, a voltage applied to the oscillation circuit is inverted. Thus, not only is a decrease in a gain of the DC/DC conversion apparatus reduced or prevented, but also a parasitic capacitance on a switch to be turned on next may be charged by the remaining energy, such that switching loss of the switch when it is turned on is reduced and, furthermore, a zero voltage switch (ZVS) is achieved.

A DC/DC conversion apparatus according to a preferred embodiment of the present invention includes a DC voltage source that outputs a DC power supply voltage; an oscillation circuit electrically connected to the DC voltage source; a plurality of switch elements; a switch controller, which connects or disconnects an electrical connection between the DC voltage source and the oscillation circuit by switching turn-on and turn-off of the plurality of switch elements, and switches a direction of a voltage applied to the oscillation circuit between a first direction and a second direction; and a transformation circuit that outputs a current generated in the oscillation circuit and converts the current into a DC current, wherein the switch controller disconnects the electrical connection between the oscillation circuit and the DC voltage source before the direction of the voltage applied to the oscillation circuit is switched from the first direction to the second direction, and connects the electrical connection between the oscillation circuit and the DC voltage source and switches the direction of the voltage applied to the oscillation circuit to the second direction after a current flowing through the oscillation circuit has been outputted to the transformation circuit.

In a DC/DC conversion apparatus according to a preferred embodiment of the present invention, the switch controller connects the electrical connection between the oscillation circuit and the DC voltage source and switches the direction of the voltage applied to the oscillation circuit to the second direction, when the current flowing through the oscillation circuit has been outputted to the transformation circuit and then after passing through a specified latency.

In a DC/DC conversion apparatus according to a preferred embodiment of the present invention, the switch controller connects the electrical connection between the oscillation circuit and the DC voltage source and switches the direction of the voltage applied to the oscillation circuit to the second direction before the current flowing through the oscillation circuit is outputted to the transformation circuit, such that a parasitic capacitance on a switch element being turned on when the direction of the voltage applied to the oscillation circuit is switched to the second direction is charged by the remaining portion of the current flowing through the oscillation circuit.

In a DC/DC conversion apparatus according to a preferred embodiment of the present invention, the switch controller disconnects the electrical connection between the oscillation circuit and the DC voltage source before the direction of the voltage applied to the oscillation circuit is switched from the second direction to the first direction, and connects the electrical connection between the oscillation circuit and the DC voltage source and switches the direction of the voltage applied to the oscillation circuit to the first direction after the current flowing through the oscillation circuit has been outputted to the transformation circuit.

In a DC/DC conversion apparatus according to a preferred embodiment of the present invention, the switch controller connects the electrical connection between the oscillation circuit and the DC voltage source and switches the direction of the voltage applied to the oscillation circuit to the first direction, when the current flowing through the oscillation circuit has been outputted to the transformation circuit and then after passing through the specified latency.

In a DC/DC conversion apparatus according to a preferred embodiment of the present invention, the switch controller connects the electrical connection between the oscillation circuit and the DC voltage source and switches the direction of the voltage applied to the oscillation circuit to the first direction before the current flowing through the oscillation circuit is outputted to the transformation circuit, such that a parasitic capacitance on a switch element being turned on when the direction of the voltage applied to the oscillation circuit is switched to the first direction is charged by the remaining portion of the current flowing through the oscillation circuit.

According to various preferred embodiments of the present invention, a phenomenon of energy reverse flow that results from energy flowing reversely from the oscillation circuit to the DC voltage source is prevented, such that energy loss in the DC/DC conversion apparatus is reduced or prevented.

Further, according to various preferred embodiments of the present invention, when other conditions are all invariable, a decrease of an output current due to a light load is compensated from when a gain of a voltage is invariable.

Furthermore, according to various preferred embodiments of the present invention, the switching loss of the switch element when it is turned on is reduced and, furthermore, the switch element achieves a zero voltage switch (ZVS).

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 4-1 to 4-3 are diagrams illustrating relationships between times at which individual switch elements Q1~Q4 are turned on/off, a current $I_{LLC}$ flowing through an oscillation circuit 2, and a voltage between a high potential side terminal Vc+ and a low potential side terminal Vc− of the oscillation circuit 2 in the first preferred embodiment of the present invention, wherein FIG. 4-1 shows a first control method, FIG. 4-2 shows a second control method, and FIG. 4-3 shows a third control method.

FIGS. 5-1 to 5-3 are diagrams illustrating relationships between times at which individual switch elements Q1~Q4 are turned on/off, a current $I_{LLC}$ flowing through an oscillation circuit 2, and a voltage between a high potential side terminal Vc+ and a low potential side terminal Vc− of the oscillation circuit 2 in a second preferred embodiment of the present invention, wherein FIG. 5-1 shows a fourth control method, FIG. 5-2 shows a fifth control method, and FIG. 5-3 shows a third control method.

FIGS. 7-1 to 7-3 are diagrams illustrating relationships between times at which individual switch elements Q1~Q4 are turned on/off, a current $I_{LLC}$ flowing through an oscillation circuit 2, and a voltage between a high potential side terminal Vc+ and a low potential side terminal Vc− of the oscillation circuit 2 in the third preferred embodiment of the present invention, wherein FIG. 7-1 shows a seventh control method, FIG. 7-2 shows a eighth control method, and FIG. 7-3 shows a ninth control method.

DETAILED DESCRIPTION OF THE PREFERRED EMBODIMENTS

First Preferred Embodiment

A DC/DC conversion apparatus according to a first preferred embodiment of the present invention will be described below with reference to FIG. 1.

Figure 1:
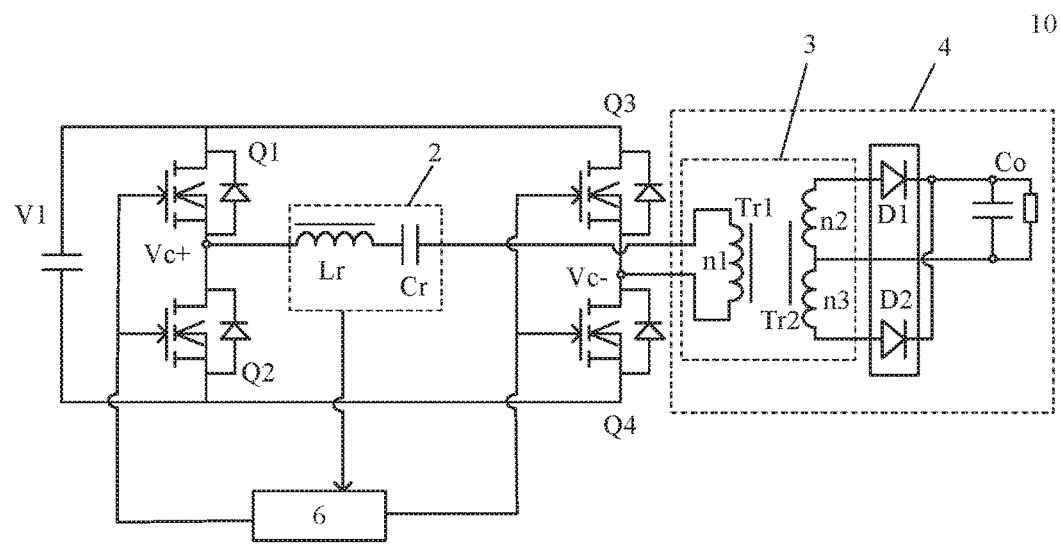
FIG. 1 is a block diagram illustrating a circuit structure of a DC/DC conversion apparatus 10 according to a first preferred embodiment of the present invention.

FIG. 1 is a block diagram illustrating a circuit structure of a DC/DC conversion apparatus 10 according to a first preferred embodiment of the present invention. As shown in FIG. 1, the DC/DC conversion apparatus 10 includes a DC voltage source V1 that outputs a DC power supply voltage Vin; an oscillation circuit 2 that is electrically connected to the DC voltage source V1; a plurality of switch elements Q1~Q4; a switch controller 6, which connects or disconnects electrical connection between the DC voltage source V1 and the oscillation circuit 2 by switching turn-on and turn-off of the plurality of switch elements Q1~Q4, and switches a direction of a voltage applied to the oscillation circuit 2 between a first direction and a second direction; and a transformation circuit 4 that outputs a current generated in the oscillation circuit 2 and converts the current into a DC current.

Specifically, a positive side of the DC voltage source V1 is connected to drain sides of a switch element Q1 and a switch element Q3, and a negative side of the DC voltage source V1 is connected to source sides of a switch element Q2 and a switch element Q4. In preferred embodiments of the present invention, the DC voltage source V1 is an electronic apparatus that is able to provide a stable DC power supply voltage Vin for a load. For example, the DC voltage source V1 may preferably be a dry battery, a storage battery, a DC generator, or other suitable electronic apparatus.

A transformer 3, rectification diodes D1 and D2, and an output capacitor Co are provided in the transformation circuit 4. The transformer 3 includes a primary side Tr1 and a secondary side Tr2, in which the primary side Tr1 includes a coil n1 and the secondary side Tr2 includes a coil n2 and a coil n3. An anode of the rectification diode D1 is connected at one terminal of the coil n2 of the secondary side Tr2 and a cathode of the rectification diode D1 is connected to the other terminal of the coil n2 of the secondary side Tr2 via the output capacitor Co. In addition, an anode of the rectification diode D2 is connected to one terminal of the coil n3 of the secondary side Tr2 and a cathode of the rectification diode D2 is connected to the cathode of the rectification diode D1.

An inductor Lr and a capacitor Cr are provided in the oscillation circuit 2, and a high potential side terminal Vc+ and a low potential side terminal Vc− are provided in the oscillation circuit 2. Moreover, the primary side Tr1 of the transformer 3 is connected in series with the oscillation circuit 2. The high potential side terminal Vc+ is connected with a connection point of the switch element Q1 and the switch element Q2 and the low potential side terminal Vc− is connected with a connection point of the switch element Q3 and the switch element Q4. Moreover, the inductor Lr and the capacitor Cr are connected in series between the high potential side terminal Vc+ and the low potential side terminal Vc− via the primary side Tr1 of the transformer 3.

Connection relationships of the plurality of switch elements Q1~Q4 are shown in FIG. 1. The first switch element Q1 is provided between the positive side of the DC voltage source V1 and the high potential side terminal Vc+ of the oscillation circuit 2, the third switch element Q3 is provided between the positive side of the DC voltage source V1 and the low potential side terminal Vc− of the oscillation circuit 2, the second switch element Q2 is provided between the negative side of the DC voltage source V1 and the high potential side terminal Vc+ of the oscillation circuit 2, and the fourth switch element Q4 is provided between the negative side of the DC voltage source V1 and the low potential side terminal Vc− of the oscillation circuit 2.

In addition, the plurality of switch elements Q1~Q4 may preferably be a field-effect transistor that is widely used in an analog circuit and a digital circuit, e.g., a metal oxide semiconductor field-effect transistor (MOSFET). The MOSFET may be divided into two types: "N-type" and "P-type" according to the different polarities of the working carriers. In preferred embodiments of the present invention, there is no restriction on the plurality of switch elements Q1~Q4, which may include the "N-type" MOSFET and may also include the "P-type" MOSFET. The plurality of switch elements Q1~Q4 may also be other types of switch elements in the present field.

The switch controller 6 switches turn-on and turn-off of the plurality of switch elements Q1~Q4 according to the inputted current $I_{LLC}$ as described above. Specifically, when the switch element Q1 and the switch element Q4 are turned on and the switch element Q2 and the switch element Q3 are turned off under the control of the switch controller 6, a voltage Vc+− applied to two terminals of the oscillation circuit 2 has the same phase as the DC power supply voltage Vin, i.e., forward voltages will be applied thereon. When the switch element Q2 and the switch element Q3 are turned on and the switch element Q1 and the switch element Q4 are turned off under the control of the switch controller 6, a voltage Vc+− applied to two terminals of the oscillation circuit 2 has a different phase from the DC power supply voltage Vin, i.e., negative voltages will be applied thereon. In addition, when the switch element Q1 and the switch element Q3 are both turned off or when the switch element Q2 and the switch element Q4 are both turned off, the oscillation circuit 2 is not electrically connected to the DC voltage source V1, i.e., no voltage will be applied to two terminals of the oscillation circuit 2.

Figure 2:
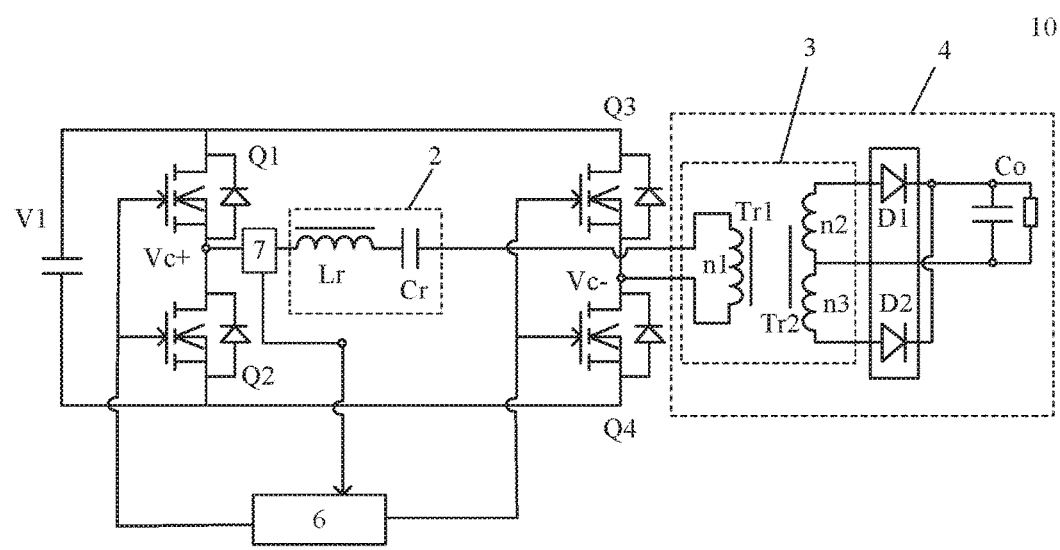
FIG. 2 is a block diagram illustrating a circuit structure of a DC/DC conversion apparatus 10 according to a first variation of a first preferred embodiment of the present invention.
Figure 3:
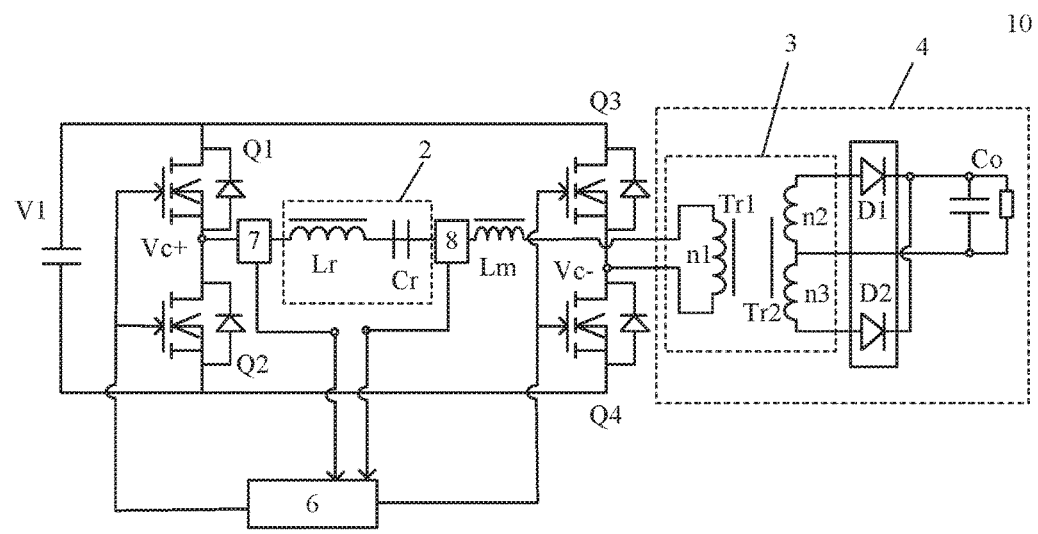
FIG. 3 is a block diagram illustrating a circuit structure of a DC/DC conversion apparatus 10 according to a second variation of a first preferred embodiment of the present invention.
Figures 1, 4:
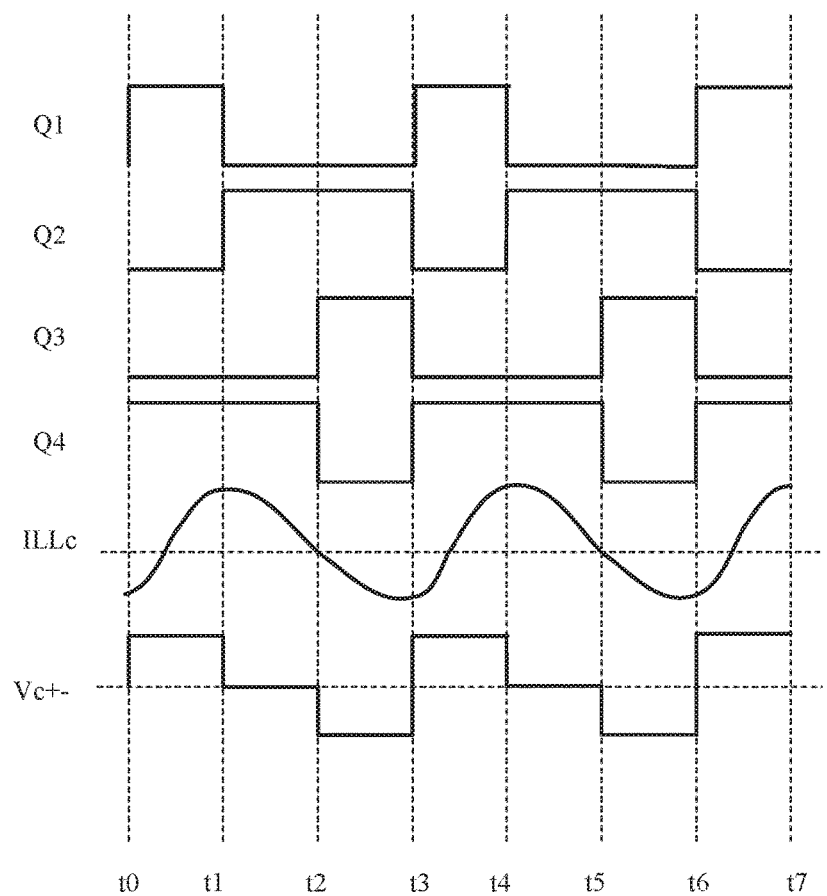
Figures 2, 4:
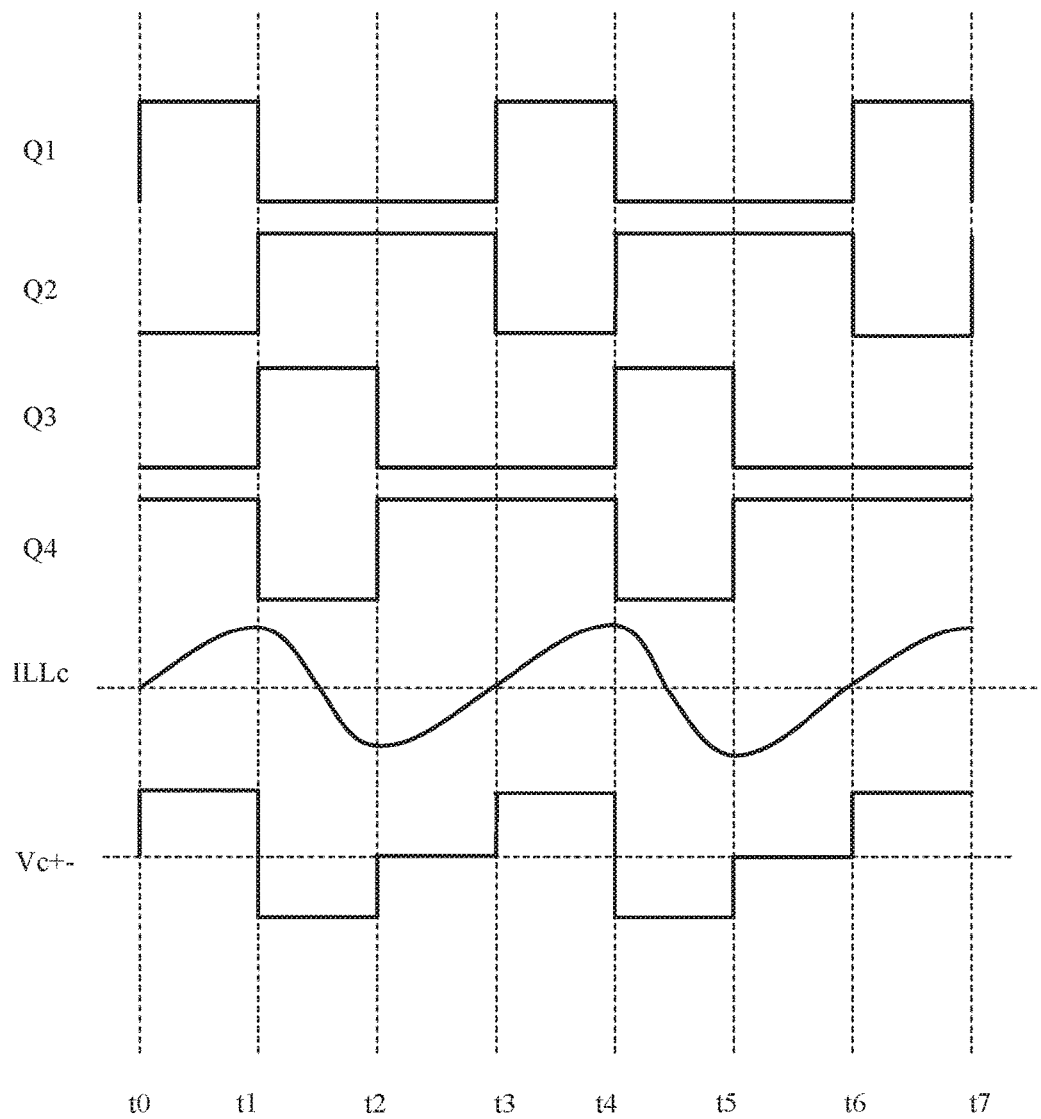
Figures 3, 4:
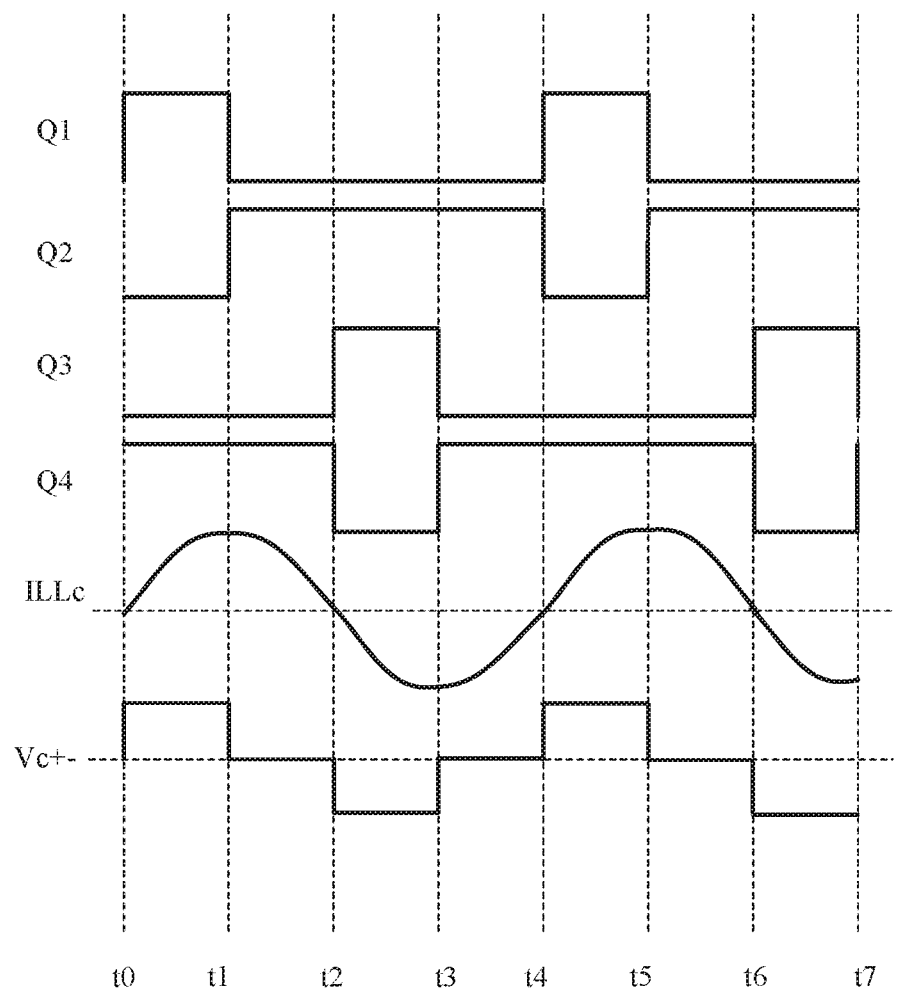

FIGS. 4-1 to 4-3 show diagrams of relationships between the times at which individual switch elements Q1~Q4 are turned on/off, a current $I_{LLC}$ flowing through the oscillation circuit 2, and a voltage between a high potential side terminal Vc+ and a low potential side terminal Vc− of the oscillation circuit 2 in FIG. 1. FIG. 4-1 shows a relationship diagram of a first control method of the switch controller 6, FIG. 4-2 shows a relationship diagram of a second control method of the switch controller 6, and FIG. 4-3 shows a relationship diagram of a third control method of the switch controller 6.

Firstly, the first control method of the switch controller 6 is set forth according to FIG. 4-1. As shown in FIG. 4-1, time t0 to time t3 is one cycle.

At time t0, the switch element Q1 and the switch element Q4 are turned on at the same time and the switch element Q2 and the switch element Q3 are turned off at the same time under the control of the switch controller 6. Thus, the electrical connection between the oscillation circuit 2 and the DC voltage source V1 is connected and the voltage Vc+− applied to the oscillation circuit 2 instantly becomes a positive value. At this moment, since a forward voltage Vc+− has been applied to the oscillation circuit 2, the current $I_{LLC}$ flowing through the oscillation circuit 2 becomes a positive value and increases gradually.

At time t1, the switch element Q2 and the switch element Q4 are turned on at the same time and the switch element Q1 and the switch element Q3 are turned off at the same time under the control of the switch controller 6. Thus, the electrical connection between the oscillation circuit 2 and the DC voltage source V1 is disconnected, the voltage Vc+− applied to the oscillation circuit 2 instantly becomes zero, but the current $I_{LLC}$ flowing through the oscillation circuit 2 is still a positive value. At this moment, since the switch element Q2 and the switch element Q4, the inductor Lr, the capacitor Cr, and the primary side Tr1 of the transformer 3 define a resonance loop, the current $I_{LLC}$ oscillates freely in the resonance loop while the capacitor Cr is charged, and energy continues to be transmitted from the inductor Lr to the primary side Tr1 of the transformer 3 until the current $I_{LLC}$ flowing through the oscillation circuit 2 becomes zero, such that the energy is transmitted to the secondary side Tr2 through the primary side Tr1 of the transformer 3.

At time t2, the current $I_{LLC}$ flowing through the oscillation circuit 2 becomes zero. At this moment, the switch element Q2 and the switch element Q3 are turned on at the same time and the switch element Q1 and the switch element Q4 are turned off at the same time under the control of the switch controller 6. As such, the electrical connection between the oscillation circuit 2 and the DC voltage source V1 is connected and the voltage Vc+− applied to the oscillation circuit 2 instantly becomes a negative value. At this moment, since a negative voltage Vc+− has been applied to the oscillation circuit 2, the current $I_{LLC}$ flowing through the oscillation circuit 2 decreases negatively from zero, i.e., becomes a negative value.

As described above, at time t2, since the current $I_{LLC}$ flowing through the oscillation circuit 2 becomes zero, no energy will be transmitted from the oscillation circuit 2 to the secondary side Tr2 via the primary side Tr1 of the transformer 3 at this moment. Thus, at time t2, no energy will flow reversely from the oscillation circuit 2 to the DC voltage source V1.

At time t3, the switch element Q1 and the switch element Q4 are turned on at the same time and the switch element Q2 and the switch element Q3 are turned off at the same time under the control of the switch controller 6. As such, the electrical connection between the oscillation circuit 2 and the DC voltage source V1 is connected and the voltage Vc+− applied to the oscillation circuit 2 instantly becomes a positive value from the negative value. At this moment, similarly to at time t0, since a forward voltage Vc+− has been applied to the oscillation circuit 2, the current $I_{LLC}$ flowing through the oscillation circuit 2 is forced to become a positive value from a negative value and increases gradually.

The second control method of the switch controller 6 is set forth according to FIG. 4-2. As shown in FIG. 4-2, time t0 to time t3 is one cycle.

At time t0, the switch element Q1 and the switch element Q4 are turned on at the same time and the switch element Q2 and the switch element Q3 are turned off at the same time under the control of the switch controller 6. As such, the electrical connection between the oscillation circuit 2 and the DC voltage source V1 is connected and the voltage Vc+− applied to the oscillation circuit 2 instantly becomes a positive value. At this moment, since a forward voltage Vc+− has been applied to the oscillation circuit 2, the current $I_{LLC}$ flowing through the oscillation circuit 2 becomes a positive value and increases gradually.

At time t1, the switch element Q2 and the switch element Q3 are turned on at the same time and the switch element Q1 and the switch element Q4 are turned off at the same time under the control of the switch controller 6. As such, the electrical connection between the oscillation circuit 2 and the DC voltage source V1 is connected and the voltage Vc+− applied to the oscillation circuit 2 instantly becomes a negative value. At this moment, since a negative voltage Vc+− has been applied to the oscillation circuit 2, the current $I_{LLC}$ flowing through the oscillation circuit 2 is forced to become a negative value from a positive value and decreases gradually.

At time t2, the switch element Q2 and the switch element Q4 are turned on at the same time and the switch element Q1 and the switch element Q3 are turned off at the same time under the control of the switch controller 6. Thus, the electrical connection between the oscillation circuit 2 and the DC voltage source V1 is disconnected, the voltage Vc+− applied to the oscillation circuit 2 instantly becomes zero, but the current $I_{LLC}$ flowing through the oscillation circuit 2 is still a negative value.

At this moment, since the switch element Q2 and the switch element Q4, the inductor Lr, the capacitor Cr, and the primary side Tr1 of the transformer 3 define a resonance loop, the current $I_{LLC}$ oscillates freely in the resonance loop while the capacitor Cr is charged, and energy continues to be transmitted from the inductor Lr to the primary side Tr1 of the transformer 3 until the current $I_{LLC}$ flowing through the oscillation circuit 2 becomes zero, such that the energy is transmitted to the secondary side Tr2 through the primary side Tr1 of the transformer 3.

At time t3, the current $I_{LLC}$ flowing through the oscillation circuit 2 becomes zero. At this moment, the switch element Q1 and the switch element Q4 are turned on at the same time and the switch element Q2 and the switch element Q3 are turned off at the same time under the control of the switch controller 6. As such, the electrical connection between the oscillation circuit 2 and the DC voltage source V1 is connected and the voltage Vc+− applied to the oscillation circuit 2 instantly becomes a positive value again. At this moment, similarly to at time t0, since a forward voltage Vc+− has been applied to the oscillation circuit 2, the current $I_{LLC}$ flowing through the oscillation circuit 2 increases gradually and forwardly from zero, i.e., becomes a positive value.

As described above, at time t3, since the current $I_{LLC}$ flowing through the oscillation circuit 2 becomes zero, no energy will be transmitted from the oscillation circuit 2 to the secondary side Tr2 via the primary side Tr1 of the transformer 3 at this moment. Thus, at time t3, no energy will flow reversely from the oscillation circuit 2 to the DC voltage source V1.

The third control method of the switch controller 6 is set forth according to FIG. 4-3. As shown in FIG. 4-3, time t0 to time t4 is one cycle.

At time t0, the switch element Q1 and the switch element Q4 are turned on at the same time and the switch element Q2 and the switch element Q3 are turned off at the same time under the control of the switch controller 6. As such, the electrical connection between the oscillation circuit 2 and the DC voltage source V1 is connected and the voltage Vc+− applied to the oscillation circuit 2 instantly becomes a positive value. At this moment, since a forward voltage Vc+− has been applied to the oscillation circuit 2, the current $I_{LLC}$ flowing through the oscillation circuit 2 becomes a positive value and increases gradually.

At time t1, the switch element Q2 and the switch element Q4 are turned on at the same time and the switch element Q1 and the switch element Q3 are turned off at the same time under the control of the switch controller 6. Thus, the electrical connection between the oscillation circuit 2 and the DC voltage source V1 is disconnected, the voltage Vc+− applied to the oscillation circuit 2 instantly becomes zero, but the current $I_{LLC}$ flowing through the oscillation circuit 2 is still a positive value. At this moment, since the switch element Q2 and the switch element Q4, the inductor Lr, the capacitor Cr, and the primary side Tr1 of the transformer 3 define a resonance loop, the current $I_{LLC}$ oscillates freely in the resonance loop while the capacitor Cr is charged by the current $I_{LLC}$, and energy continues to be transmitted from the inductor Lr to the primary side Tr1 of the transformer 3 until the current $I_{LLC}$ flowing through the oscillation circuit 2 becomes zero, such that the energy is transmitted to the secondary side Tr2 through the primary side Tr1 of the transformer 3.

At time t2, the current $I_{LLC}$ flowing through the oscillation circuit 2 becomes zero. At this moment, the switch element Q2 and the switch element Q3 are turned on at the same time and the switch element Q1 and the switch element Q4 are turned off at the same time under the control of the switch controller 6. As such, the electrical connection between the oscillation circuit 2 and the DC voltage source V1 is connected and the voltage Vc+− applied to the oscillation circuit 2 instantly become a negative value. At this moment, since a negative voltage Vc+− has been applied to the oscillation circuit 2, the current $I_{LLC}$ flowing through the oscillation circuit 2 decreases negatively from zero, i.e., becomes a negative value.

As described above, at time t2, since the current $I_{LLC}$ flowing through the oscillation circuit 2 becomes zero, no energy will be transmitted from the oscillation circuit 2 to the secondary side Tr2 via the primary side Tr1 of the transformer 3 at this moment. Thus, at time t2, no energy will flow reversely from the oscillation circuit 2 to the DC voltage source V1.

At time t3, the switch element Q2 and the switch element Q4 are turned on at the same time and the switch element Q1 and the switch element Q3 are turned off at the same time under the control of the switch controller 6. Thus, the electrical connection between the oscillation circuit 2 and the DC voltage source V1 is disconnected, the voltage Vc+− applied to the oscillation circuit 2 instantly becomes zero, but the current $I_{LLC}$ flowing through the oscillation circuit 2 is still a negative value. At this moment, since the switch element Q2 and the switch element Q4, the inductor Lr, the capacitor Cr, and the primary side Tr1 of the transformer 3 define a resonance loop, the current $I_{LLC}$ oscillates freely in the resonance loop while the capacitor Cr is charged by the current $I_{LLC}$, and energy continues to be transmitted from the inductor Lr to the primary side Tr1 of the transformer 3 until the current $I_{LLC}$ flowing through the oscillation circuit 2 becomes zero, such that the energy is transmitted to the secondary side Tr2 through the primary side Tr1 of the transformer 3.

At time t4, the current $I_{LLC}$ flowing through the oscillation circuit 2 becomes zero. At this moment, the switch element Q1 and the switch element Q4 are turned on at the same time and the switch element Q2 and the switch element Q3 are turned off at the same time under the control of the switch controller 6. As such, the electrical connection between the oscillation circuit 2 and the DC voltage source V1 is connected and the voltage Vc+− applied to the oscillation circuit 2 instantly becomes a positive value again. At this moment, similarly to at time to, since a forward voltage Vc+− has been applied to the oscillation circuit 2, the current $I_{LLC}$ flowing through the oscillation circuit 2 increases gradually and forwardly from zero, i.e., becomes a positive value.

As described above, at time t4, since the current $I_{LLC}$ flowing through the oscillation circuit 2 becomes zero, no energy will be transmitted from the oscillation circuit 2 to the secondary side Tr2 via the primary side Tr1 of the transformer 3 at this moment. Thus, at time t4, no energy will flow reversely from the oscillation circuit 2 to the DC voltage source V1.

As described above, the first to third control methods preferably used in the first preferred embodiment of the present invention have been set forth according to the diagrams as shown in FIG. 4-1, FIG. 4-2, and FIG. 4-3.

As shown in FIG. 4-1, FIG. 4-2, and FIG. 4-3, within one cycle, actions of turn-on or turn-off of the switch element Q1 and the switch element Q2 are exactly opposite, and actions of turn-on or turn-off of the switch element Q3 and the switch element Q4 are also exactly opposite.

Moreover, as shown in FIG. 4-1, FIG. 4-2, and FIG. 4-3, within one cycle, preferably, the time lengths of turn-on or turn-off of the switch element Q1 and the switch element Q3 are equal or substantially equal, time lengths of turn-on or turn-off of the switch element Q2 and the switch element Q4 are equal or substantially equal, and the time lengths of turn-on of the switch element Q2 and the switch element Q4 are greater than the time lengths of turn-on of the switch element Q1 and the switch element Q3.

In addition, for the individual switch elements Q1~Q4, those skilled in the art should understand that, in fact, they cannot be turned on or turned off at exactly the same time due to a dead zone, i.e., there is a time difference between the turn-off and the turn-on. Although the dead zone is not described in the present specification and the switch elements Q1~Q4 are described to be turned on or turned off at the same time, it does not mean that the concept of the "dead zone" does not exist.

As described above, the technical content that "the current $I_{LLC}$ flowing through the oscillation circuit 2 becomes zero" has been described in the first preferred embodiment. However, in the present technical field, according to whether a parasitic inductance Lm on the primary Tr1 of the transformer 3 being considered, a case in which "the current $I_{LLC}$ flowing through the oscillation circuit 2 becomes zero" will be different.

First Variation of First Preferred Embodiment

FIG. 2 is a block diagram illustrating a circuit structure of a DC/DC conversion apparatus according to a first variation of the first preferred embodiment of the present invention.

When the parasitic inductance Lm on the primary side Tr1 of the transformer 3 connected with the oscillation circuit 2 is very small, a current ILm flowing through the parasitic inductance may be ignored. At this moment, "the current $I_{LLC}$ flowing through the oscillation circuit 2" is equal or substantially equal to the current ILr flowing through the inductor Lr. Moreover, as shown in FIG. 2, a first detector 7 is provided on the inductor Lr, and the current ILr flowing through the inductor Lr is detected by the first detector 7. In this case, when the current detected by the first detector 7 is equal or substantially equal to zero (i.e., ILr=0), turn-on or turn-off of the switch elements Q1~Q4 is switched by the switch controller 6 such that the direction of the voltage applied to the oscillation circuit 2 is inverted.

In other words, when the parasitic inductance Lm on the primary side Tr1 of the transformer 3 is not considering, "the current $I_{LLC}$ flowing through the oscillation circuit 2 becomes zero" means that the current ILr flowing through the inductor Lr becomes zero.

Second Variation of First Preferred Embodiment

FIG. 3 is a block diagram illustrating a circuit structure of a DC/DC conversion apparatus according to a second variation of the first preferred embodiment of the present invention.

When the parasitic inductance Lm on the primary side Tr1 of the transformer 3 connected with the oscillation circuit 2 is relatively large, the current ILm flowing through the parasitic inductance cannot be ignored. At this moment, "the current $I_{LLC}$ flowing through the oscillation circuit 2" is equal or substantially equal to a difference between the current ILr flowing through the inductor Lr and the current ILm flowing through the parasitic inductance Lm, i.e., ILr−ILm. Moreover, as shown in FIG. 3, a first detector 7 is provided on the inductor Lr and a second detector 8 is provided on the primary side Tr1 of the transformer 3. The current ILr flowing through the inductor Lr is detected by the first detector 7, while the current ILm flowing through the parasitic inductance Lm is detected by the second detector 8. In this case, when a difference between the current detected by the first detector 7 and the current detected by the second detector 8 is equal or substantially equal to zero (i.e., ILr−ILm=0), turn-on or turn-off of the switch elements Q1~Q4 is switched by the switch controller 6 such that the direction of the voltage applied to the oscillation circuit 2 is inverted.

In other words, when the parasitic inductance Lm on the primary side Tr1 of the transformer 3 is considered, "the current $I_{LLC}$ flowing through the oscillation circuit 2 becomes zero" means that the difference between the current ILr flowing through the inductor Lr and the current ILm flowing through the parasitic inductance Lm becomes zero.

As described above, when the switch elements Q1~Q4 are controlled according to the first to third control methods as shown in FIG. 4-1, FIG. 4-2, and FIG. 4-3, respectively, it is assumed that a loop being defined when the switch elements Q1 and Q4 are turned on and the switch elements Q2 and Q3 are turned off is referred to as a first resonance loop and a loop being defined when the switch elements Q2 and Q3 are turned on and the switch elements Q1 and Q4 are turned off is referred to as a second resonance loop.

In the prior art, before switching from the first resonance loop to the second resonance loop or before switching from the second resonance loop to the first resonance loop, the switch controller 6 may switch turn-on or turn-off of the switch elements Q1~Q4 to disconnect the electrical connection between the DC voltage source V1 and the oscillation circuit 2, such that nonconsecutive input from the DC voltage source V1 to the oscillation circuit 2 will be performed. However, in this case, since it is not specifically restricted when the electrical connection between the DC voltage source V1 and the oscillation circuit 2 will be connected again (i.e., the time at which the nonconsecutive input will be ended is not specifically restricted), the electrical connection between the DC voltage source V1 and the oscillation circuit 2 may be connected again when not all of the energy stored in the oscillation circuit 2 has been transmitted from the primary side Tr1 to the secondary side Tr2 of the transformer 3, such that the portion of remaining energy will flow reversely from the oscillation circuit 2 into the DC voltage source V1, which will eventually result in energy loss.

However, in a preferred embodiment of the present invention, as shown in FIG. 4-1 and FIG. 4-3, before switching from the first resonance loop to the second resonance loop (i.e., before the voltage applied to the oscillation circuit 2 is switched from a positive value to a negative value), the electrical connection between the oscillation circuit 2 and the DC voltage source V1 is firstly disconnected, and then switching to the second resonance loop is performed after the current $I_{LLC}$ flowing through the oscillation circuit 2 has been entirely outputted to the transformation circuit 4, such that the electrical connection between the oscillation circuit 2 and the DC voltage source V1 is connected and the voltage applied to the oscillation circuit 2 becomes a negative value. On the other hand, as shown in FIG. 4-2 and FIG. 4-3, before switching from the second resonance loop to the first resonance loop (i.e., before the voltage applied to the oscillation circuit 2 is switched from a negative value to a positive value), the electrical connection between the oscillation circuit 2 and the DC voltage source V1 is firstly disconnected, and then switching to the first resonance loop is performed after the current $I_{LLC}$ flowing through the oscillation circuit 2 has been entirely outputted to the transformation circuit 4, such that the electrical connection between the oscillation circuit 2 and the DC voltage source V1 is connected and the voltage applied to the oscillation circuit 2 becomes a positive value.

Therefore, according to the first to third control methods utilized in the first preferred embodiment of the present invention, since all of the energy stored in the oscillation circuit 2 may be transmitted from the primary side Tr1 to the secondary side Tr2 of the transformer 3, such that the energy will not flow reversely from the oscillation circuit 2 to the DC voltage source V1, energy loss is prevented and the efficiency of energy transmission is improved.

In addition, the effects on the gain of the DC/DC conversion apparatus include the following two aspects.

In a first aspect, if a ratio of an inductance of the inductor Lr and the parasitic inductance Lr on the primary side Tr1 of the transformer 3 (i.e., Lr/Lm) is larger, a time required for the current $I_{LLC}$ flowing through the oscillation circuit 2 to return to zero will be relatively large and the time required for the current $I_{LLC}$ to return to zero increases, which also means that the time per cycle increases. Thus, the average output energy within each cycle will be reduced and, as a result, the gain will be decreased.

In a second aspect, if a ratio of the inductance of the inductor Lr and a capacitance of the capacitor Cr (i.e., Lr/Cr) is larger, a time required for the capacitor Cr being charged within the time of the current $I_{LLC}$ to return to zero increases and a voltage on the capacitor Cr increases, which also means that when the direction of the voltage applied to the oscillation circuit 2 is switched, a slope of the increasing of the current $I_{LLC}$ will increase. Thus, energy inputted onto the primary side Tr1 of the transformer 3 increases and, as a result, the gain will increase.

As described above, in the DC/DC conversion apparatus according to the first preferred embodiment of the present invention, when working frequencies of the switch elements are invariable, variations of the gain depend on the two aspects of "the time of the current $I_{LLC}$ returning to zero" and "the charging voltage on the capacitor Cr" effecting on the gain at the same time.

In addition, in the present technical field, if the load is larger, increasing of the time required for the current $I_{LLC}$ to return to zero means that more energy will flow out at the time of returning to zero. As a result, the gain will decrease. In contrast, as the load is decreased, the effect of the charging voltage on the capacitor Cr becomes larger. As a result, the gain will increase.

Therefore, in the first preferred embodiment of the present invention, according to a size of the load, the effects of both "the time of the current $I_{LLC}$ returning to zero" and "the charging voltage on the capacitor Cr" on the gain may be adjusted by appropriately setting the two parameters of "Lr/Lm" and "Lr/Cr". Thus, a size of the gain may be adjusted appropriately according to the size of the load, i.e., increasing the gain or decreasing the gain.

Second Preferred Embodiment

In a DC/DC conversion apparatus according to a second preferred embodiment of the present invention, the structure is the same or substantially the same as that of the DC/DC conversion apparatus 10 according to the first preferred embodiment as shown in FIGS. 1-3, but the method of controlling individual switch elements Q1~Q4 is different.

Figures 1, 5:
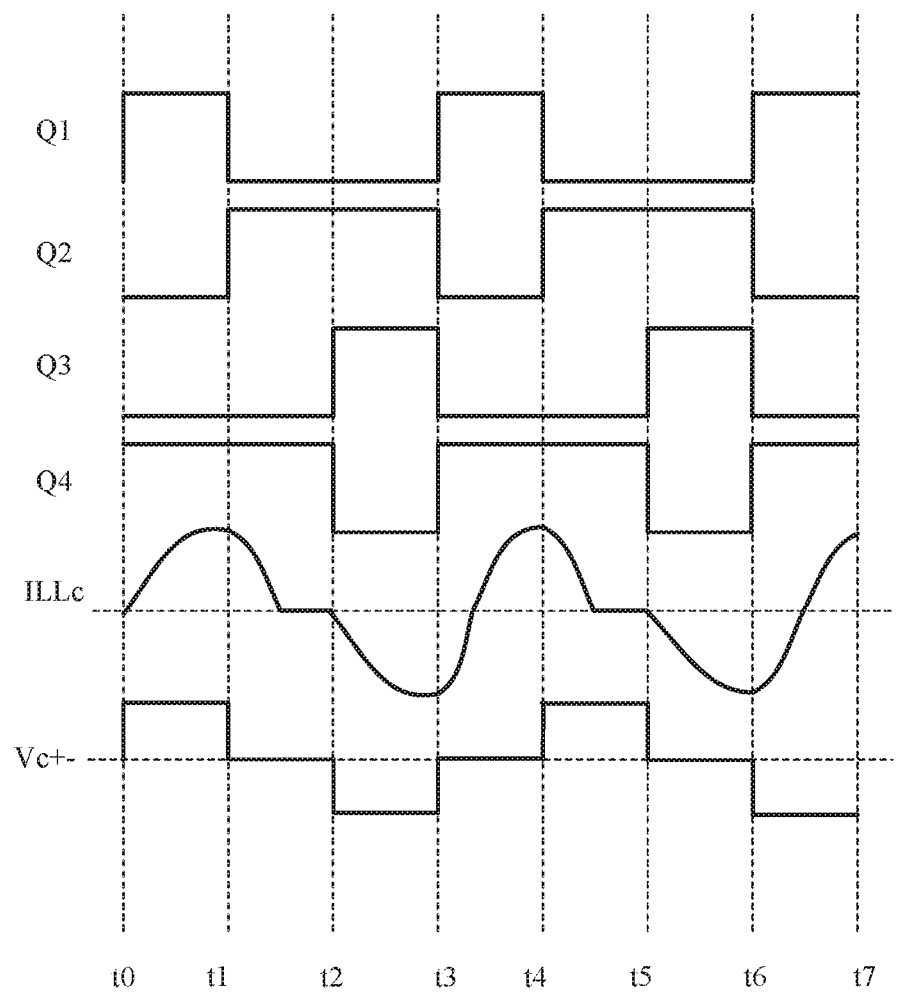
Figures 2, 5:
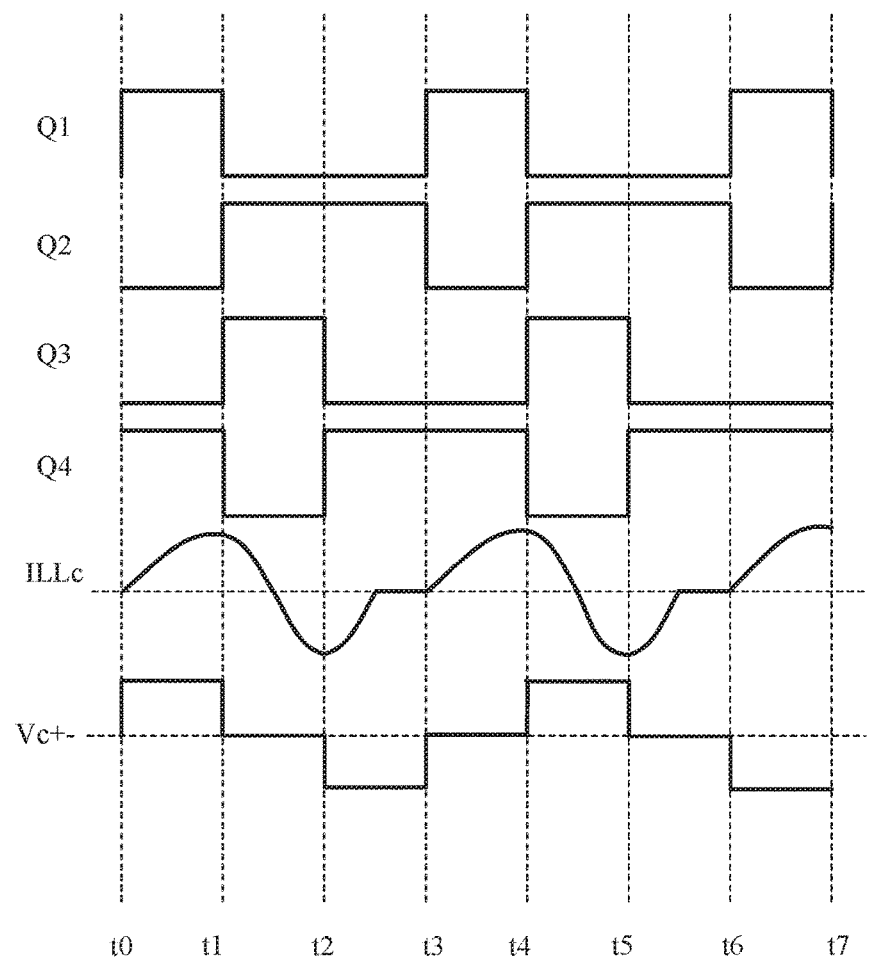
Figures 3, 5:
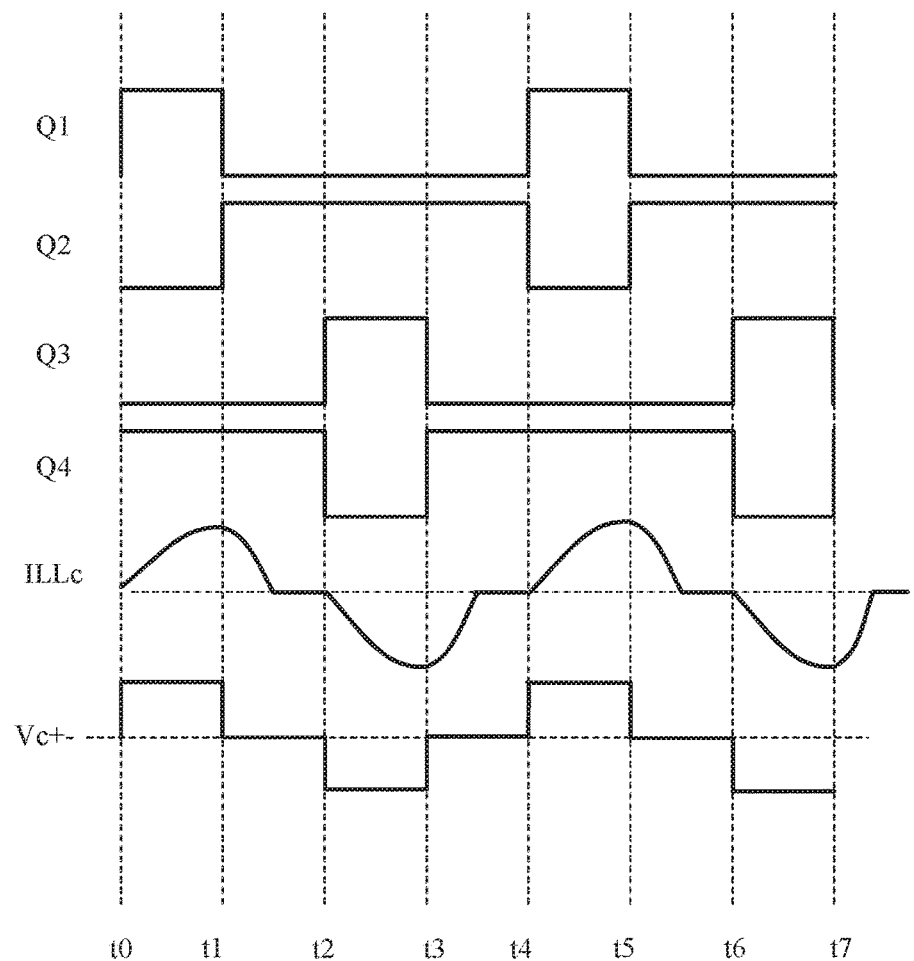

FIGS. 5-1 to 5-2 show diagrams of relationships between times at which individual switch elements Q1~Q4 in the second preferred embodiment are turned on/off, a current $I_{LLC}$ flowing through an oscillation circuit 2, and a voltage between a high potential terminal Vc+ and a low potential terminal Vc− of the oscillation circuit 2. Differences between fourth to sixth control methods of the second preferred embodiment as shown in FIG. 5-1, FIG. 5-2, and FIG. 5-3 and the first to third control methods of the first preferred embodiment as shown in FIG. 4-1, FIG. 4-2, and FIG. 4-3 are respectively set forth below.

During time period t1-t2 in FIG. 5-1 and time period t1-t2 in FIG. 5-2, after the current $I_{LLC}$ flowing through the oscillation circuit 2 becomes zero and after a latency Δt, the switch element Q2 and the switch element Q3 are turned on at the same time and the switch element Q1 and the switch element Q4 are turned off at the same time under the control of the switch controller 6, such that the voltage Vc+− applied to the oscillation circuit 2 instantly becomes a negative value.

Similarly, during time period t2-t3 in FIG. 5-2 and time period t3-t4 in FIG. 5-3, after the current $I_{LLC}$ flowing through the oscillation circuit 2 becomes zero and after a latency Δt, the switch element Q1 and the switch element Q4 are turned on at the same time and the switch element Q2 and the switch element Q3 are turned off at the same time under the control of the switch controller 6, such that the voltage Vc+− applied to the oscillation circuit 2 instantly becomes a positive value.

In other words, in the second preferred embodiment of the present invention, a latency Δt is added after the current $I_{LLC}$ passing through the oscillation circuit 2 becomes zero. When other conditions are all invariable, an output current of the DC/DC conversion apparatus decreases because the total output energy remains constant by adding the latency Δt.

In the second preferred embodiment of the present invention, the fourth to sixth methods of controlling the individual switch elements Q1~Q4 are applicable to the following cases.

As shown in FIGS. 5-3, when the load is a light load, since the output current needs to be reduced to avoid the load from being damaged, the working frequencies are generally increased to decrease the gain so as to reduce the output current in the prior art. However, as the working frequencies of the switch elements increase, a loss related to the frequencies (e.g., a loss of turning off the MOSFET switch each time), a turn-on loss due to skin effect, proximity effect, and other effects, a loss of a magnetic core, and other losses increase rapidly.

However, in the DC/DC conversion apparatus according to the second preferred embodiment, a latency Δt is added after the current $I_{LLC}$ flowing through the oscillation circuit 2 becomes zero. Within the latency Δt, although the switch elements Q2 and Q4 are turned on continuously, no energy is transmitted from the oscillation circuit 2 to the secondary side Tr2 via the primary side Tr1 of the transformer 3 at this moment. Therefore, no energy flows reversely from the oscillation circuit 2 to the DC voltage source V1 at this moment, such that the energy loss is avoided, and since the total output energy within one cycle remains constant and the total time of one cycle is expanded by adding a latency Δt, the gain varies consecutively so as to adjust the output current to compensate for the change of the load.

As shown above, in the DC/DC conversion apparatus according to the second preferred embodiment, the energy loss resulting from energy flowing reversely from the oscillation circuit 2 to the DC voltage source V1 is avoided. Moreover, when the gain of the voltage is invariable, decreasing of the current due to the light load must be compensated for, and thus, a latency is added, which maintains the output voltage constant but decrease the output current, such that the light load will not be damaged due to over-current when the other conditions are all invariable.

Third Preferred Embodiment

Figure 6:
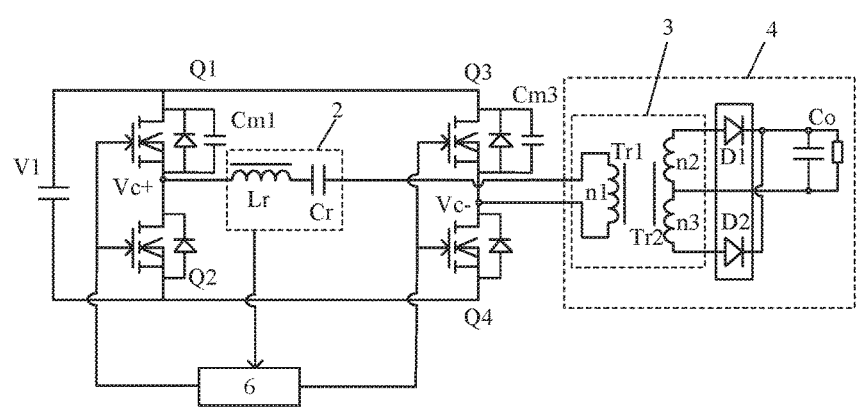
FIG. 6 shows a circuit structure of a DC/DC conversion apparatus 10 according to a third preferred embodiment of the present invention.

FIG. 6 shows a circuit structure of a DC/DC conversion apparatus 10 according to a third preferred embodiment of the present invention. A difference between FIG. 6 and FIG. 1 is that parasitic capacitances Cm1 and Cm3 on the switch element Q1 and the switch element Q3 are considered in FIG. 6.

In the first preferred embodiment, as described above, when the switch elements Q1 and Q3 are turned off and the switch elements Q2 and Q4 are turned on, when the current $I_{LLC}$ flowing through the oscillation circuit 2 becomes zero, the switch elements Q2 and Q3 are switched to turn-on and the switch elements Q1 and Q4 are switched to turn-off. At this moment, the switch element Q3 is switched from turn-off to turn-on. Since the current $I_{LLC}$ flowing through the oscillation circuit 2 is zero at this moment, at a time that the switch element Q3 is switched from turn-off to turn-on, there is no current to charge the parasitic capacitance Cm3 on the switch element Q3, thus, the DC voltage source V1 is applied to two terminals of the switch element Q3 directly. In contrast, when the switch elements Q1 and Q3 are turned off and the switch elements Q2 and Q4 are turned on, when the current $I_{LLC}$ flowing through the oscillation circuit 2 becomes zero, the switch elements Q2 and Q3 are switched to turn-off and the switch elements Q1 and Q4 are switched to turn-on. At this moment, the switch element Q1 is switched from turn-off to turn-on. Since the current $I_{LLC}$ flowing through the oscillation circuit 2 is zero at this moment, at a time that the switch element Q1 is switched from turn-off to turn-on, there is no current to charge the parasitic capacitance Cm1 on the switch element Q1, thus, the DC voltage source V1 is applied to two terminals of the switch element Q1 directly.

As a result, for the switch element Q1 and the switch element Q3, larger switching loss will be generated when the switches are turned on, i.e., a zero voltage switch (ZVS) cannot be achieved.

FIG. 7-1, FIG. 7-2, and FIG. 7-3 show seventh to ninth control methods of the switch controller 6. Differences between the seventh to ninth control methods of the third preferred embodiment as shown in FIG. 7-1, FIG. 7-2, and FIG. 7-3 and the first to third control methods of the first preferred embodiment as shown in FIG. 4-1, FIG. 4-2, and FIG. 4-3 are respectively set forth below.

Figures 1, 7:
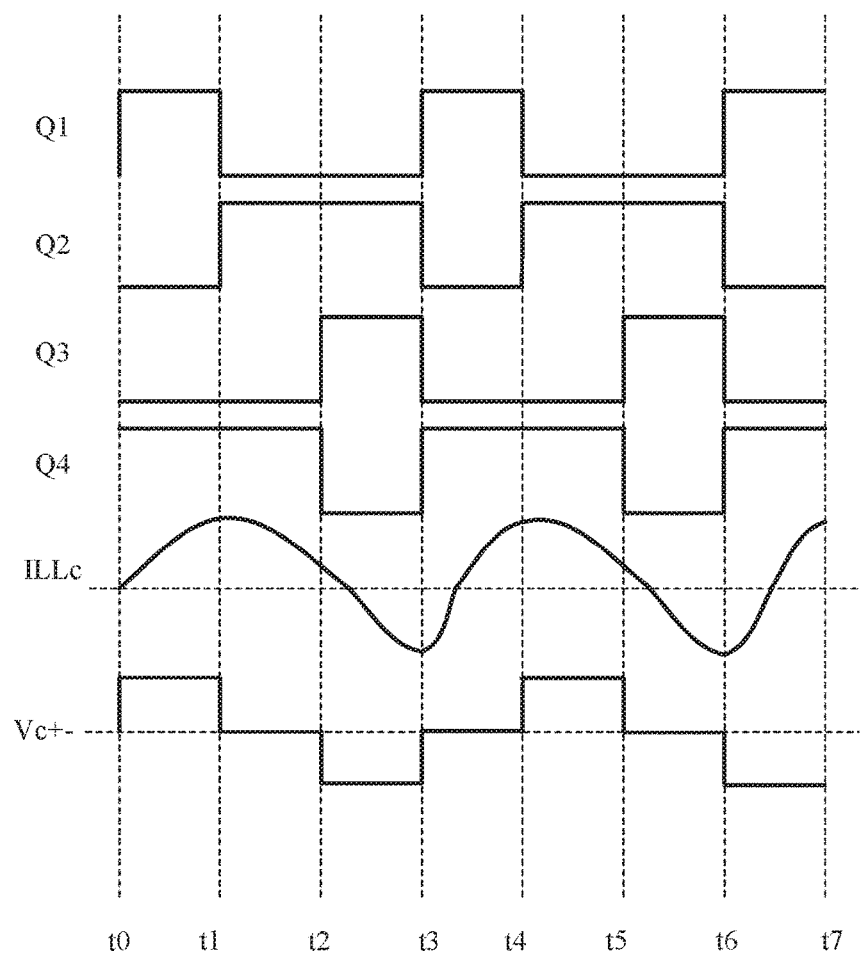
Figures 2, 7:
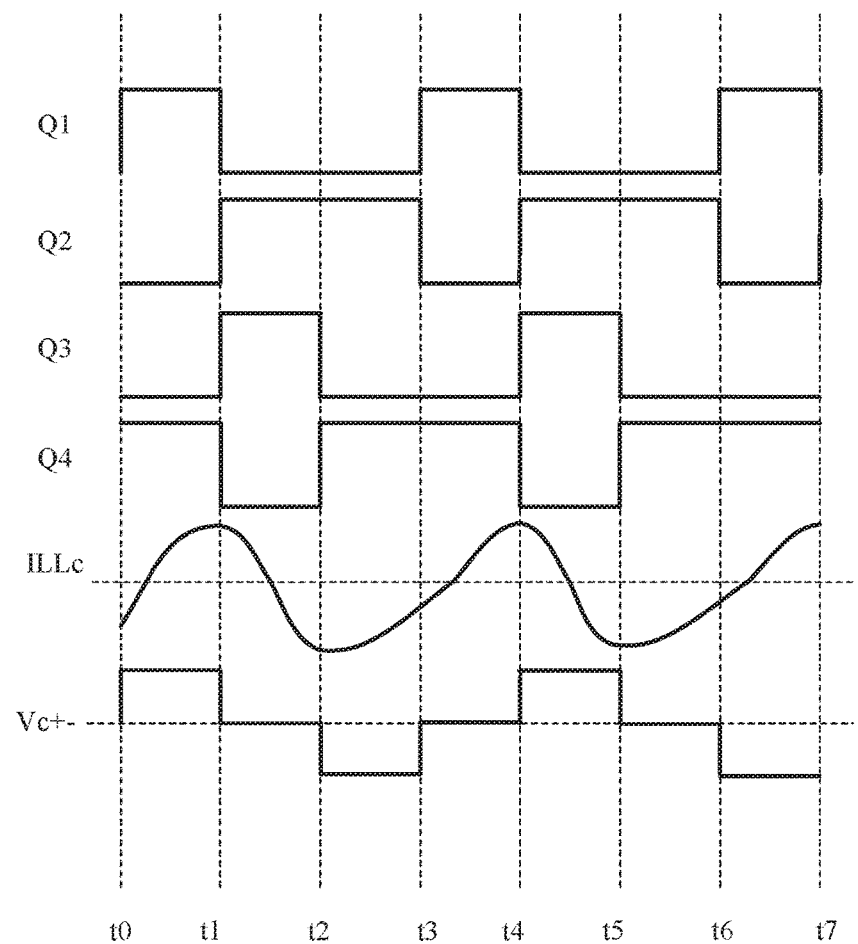
Figures 3, 7:
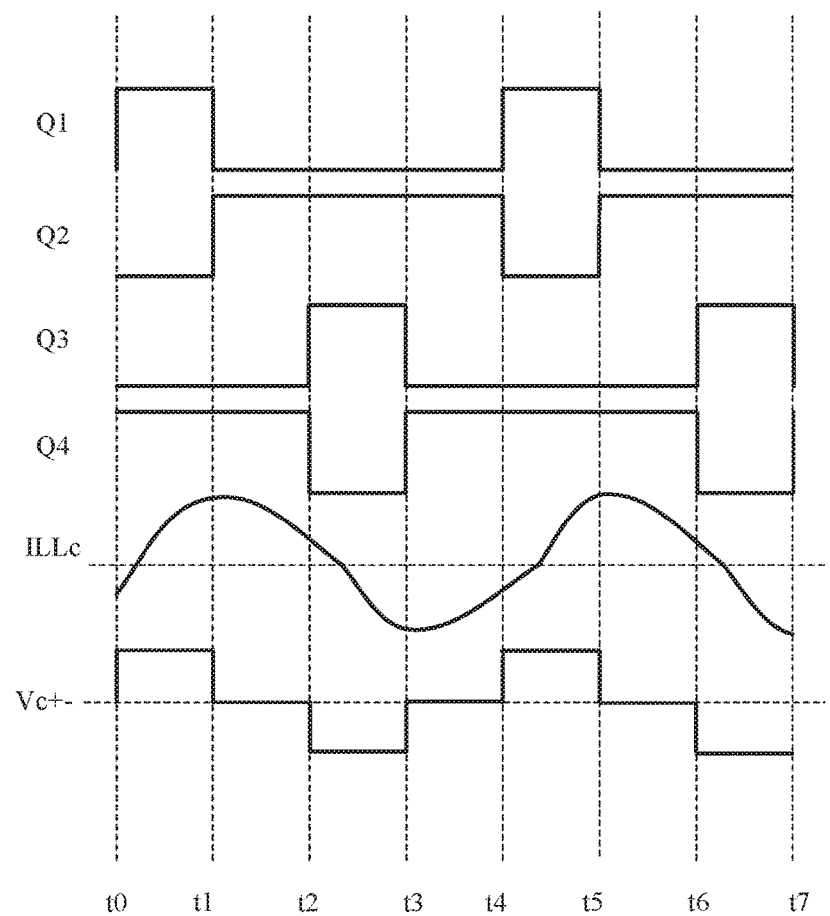
Figure 8:
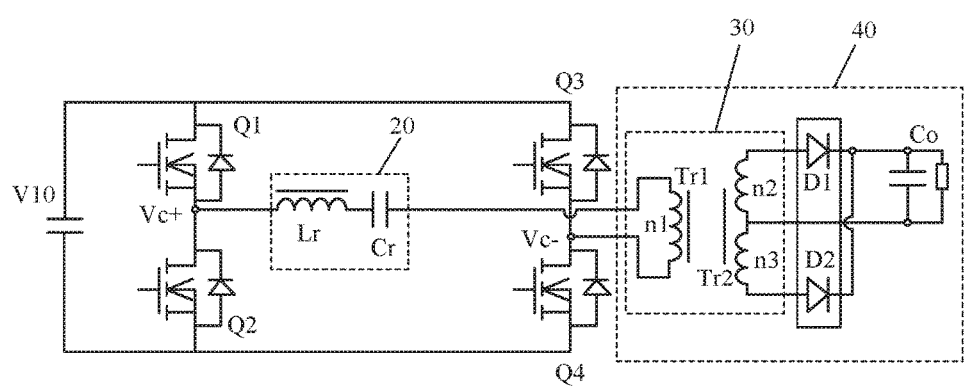
FIG. 8 is a block diagram illustrating a circuit structure of a DC/DC conversion apparatus 100 that includes a LLC full-bridge circuit in the prior art.

A difference between FIG. 7-1 and FIG. 4-1 is that, at time t2, the current $I_{LLC}$ flowing through the oscillation circuit 2 has not become zero. At this moment, the switch element Q2 and the switch element Q3 are turned on at the same time and the switch element Q1 and the switch element Q4 are turned off at the same time under the control of the switch controller 6. As such, the electrical connection between the oscillation circuit 2 and the DC voltage source V1 is connected and the voltage Vc+− applied to the oscillation circuit 2 instantly become a negative value. At this moment, since a negative voltage Vc+− has been applied to the oscillation circuit 2, the current $I_{LLC}$ flowing through the oscillation circuit 2 decreases negatively from zero, i.e., becomes a negative value.

As described above, at time t2, the parasitic capacitance Cm3 of the switch element Q3 will be charged by the current $I_{LLC}$ flowing through the oscillation circuit 2 in a direction that is opposite to that of a voltage applied to the switch element Q3 when the switch element Q3 is turned on. Thus, when the switch element Q3 is turned on at time t2, the total voltage applied to two terminals of the switch element Q3 will decrease, such that switching loss of the switch element Q3 when it is turned on is reduced. Furthermore, by adjusting time t2 and even making the total voltage applied to two terminals of the switch element Q3 be zero when the switch element Q3 is turned on, the switching loss of the switch element Q3 when it is turned on can be zero at this moment, i.e., the switch element Q3 is achieved as a zero voltage switch (ZVS).

A difference between FIG. 7-2 and FIG. 4-2 is that, at time t3, the current $I_{LLC}$ flowing through the oscillation circuit 2 has not become zero. At this moment, the switch element Q1 and the switch element Q4 are turned on at the same time and the switch element Q2 and the switch element Q3 are turned off at the same time under the control of the switch controller 6. As such, the electrical connection between the oscillation circuit 2 and the DC voltage source V1 is connected and the voltage Vc+− applied to the oscillation circuit 2 instantly becomes a positive value. At this moment, since a forward voltage Vc+− has been applied to the oscillation circuit 2, the current $I_{LLC}$ flowing through the oscillation circuit 2 increases forwardly from zero, i.e., becomes a positive value.

As described above, at time t3, the parasitic capacitance Cm1 of the switch element Q1 will be charged by the current $I_{LLC}$ flowing through the oscillation circuit 2 in a direction that is opposite to that of a voltage applied to the switch element Q1 when the switch element Q1 is turned on. Thus, when the switch element Q1 is turned on at time t3, the total voltage applied to two terminals of the switch element Q1 will decease such that switching loss of the switch element Q1 when it is turned on is reduced. Furthermore, by adjusting time t3 and even making the total voltage applied to two terminals of the switch element Q1 be zero when the switch element Q1 is turned on, the switching loss of the switch element Q1 when it is turned on can be zero at this moment, i.e., the switch element Q1 is achieved as a zero voltage switch (ZVS).

A difference between FIG. 7-3 and FIG. 4-3 is that, at time t2, the current $I_{LLC}$ flowing through the oscillation circuit 2 has not become zero. At this moment, the switch element Q2 and the switch element Q3 are turned on at the same time and the switch element Q1 and the switch element Q4 are turned off at the same time under the control of the switch controller 6. As such, the electrical connection between the oscillation circuit 2 and the DC voltage source V1 is connected and the voltage Vc+− applied to the oscillation circuit 2 instantly become a negative value. At this moment, since a negative voltage Vc+− has been applied to the oscillation circuit 2, the current $I_{LLC}$ flowing through the oscillation circuit 2 decreases negatively from zero, i.e., becomes a negative value. Moreover, at time t4, the current $I_{LLC}$ flowing through the oscillation circuit 2 has not become zero. At this moment, the switch element Q1 and the switch element Q4 are turned on at the same time and the switch element Q2 and the switch element Q3 are turned off at the same time under the control of the switch controller 6. As such, the electrical connection between the oscillation circuit 2 and the DC voltage source V1 is connected and the voltage Vc+− applied to the oscillation circuit 2 instantly becomes a positive value. At this moment, since a forward voltage Vc+− has been applied to the oscillation circuit 2, the current $I_{LLC}$ flowing through the oscillation circuit 2 increases forwardly from zero, i.e., becomes a positive value.

As described above, at time t2, the switching loss of the switch element Q3 when it is turned on is reduced and at time t4, the switching loss of the switch element Q1 when it is turned on is reduced. Furthermore, by adjusting time t2, the switch element Q3 can define and function as a zero voltage switch (ZVS). Similarly, by adjusting time t4, the switch element Q1 can define and function as a zero voltage switch (ZVS).

Therefore, according to the third preferred embodiment of the present invention, before the current $I_{LLC}$ flowing through the oscillation circuit 2 is entirely outputted to the secondary side Tr2 via the primary side Tr1 of the transformer 3, the electrical connection between the oscillation circuit 2 and the DC voltage source V1 is connected and a direction of the voltage applied to the oscillation circuit 2 is switched to be negative. Thus, the parasitic capacitance Cm3 on the switch element Q3 being turned on when the direction of the voltage applied to the oscillation circuit 2 is switched to be negative is charged by the remaining portion of the current $I_{LLC}$ flowing through the oscillation circuit 2, such that the switching loss of the switch element Q3 is reduced and, furthermore, the switch element Q3 is achieved as a zero voltage switch (ZVS).

Similarly, according to the third preferred embodiment of the present invention, before the current $I_{LLC}$ flowing through the oscillation circuit 2 is outputted to the secondary side Tr2 via the primary side Tr1 of the transformer 3, the electrical connection between the oscillation circuit 2 and the DC voltage source V1 is connected and the direction of the voltage applied to the oscillation circuit 2 is switched to be forward. Thus, the parasitic capacitance Cm1 on the switch element Q1 being turned on when the direction of the voltage applied to the oscillation circuit 2 is switched to be forward is charged by the remaining portion of the current $I_{LLC}$ flowing through the oscillation circuit 2, such that the switching loss of the switch element Q1 is reduced and, furthermore, the switch element Q1 is achieved as a zero voltage switch (ZVS).

On the other hand, when ILr=ILm, if the condition of achieving the zero voltage switch (ZVS) cannot be satisfied because energy stored in Lr and Lm is less, preferably, the switch element Q4 may be turned off and the switch element Q3 or the switch element Q1 may be turned on in advance. In other words, when ILr>ILm, the switch element Q4 is turned off in advance. At this moment, more of the energy stored in the inductor Lr is able to be used to achieve the zero voltage switch (ZVS). In addition, if ILr is smaller, the time required to achieve the zero voltage switch (ZVS) will be larger. Thus, in order to reduce the time required to achieve the zero voltage switch (ZVS), the above method may also be utilized. In other words, when ILr>ILm, the switch element Q4 is turned off in advance, such that switching loss of the switch elements Q1 and Q3 is reduced and, furthermore, the switch elements Q1 and Q3 are achieved as zero voltage switches (ZVS).

In addition, for setting time t2 in FIG. 7-1, time t3 in FIG. 7-2, and time t2 and time t4 in FIG. 7-3, a parasitic inductance Lm on the primary side Tr1 of the transformer 3 may not be considered or the parasitic inductance Lm on the primary side Tr1 of the transformer 3 may be considered, similarly to as in the first preferred embodiment.

When not considering the parasitic inductance Lm on the primary side Tr1 of the transformer 3, a first detector 7 is provided on the inductor Lr and a current ILr flowing through the inductor Lr is detected by the first detector 7. In this case, when the current ILr detected by the first detector 7 become greater than zero and less than or equal to a first threshold, turn-on or turn-off of the switch elements Q1~Q4 is switched by the switch controller 6, such that the direction of the voltage applied to the oscillation circuit 2 is inverted.

In contrast with this, when considering the parasitic inductance Lm on the primary side Tr1 of the transformer 3, the first detector 7 is provided on the inductor Lr and a second detector 8 is provided on the primary side Tr1 of the transformer 3. The current ILr flowing through the inductor Lr is detected by the first detector 7 while the current ILm flowing through the parasitic inductance Lm is detected by the second detector 8. In this case, when a difference between the current ILr detected by the first detector 7 and the current detected by the second detector 8 (i.e., ILr−ILm) becomes greater than zero and less than or equal to the first threshold, turn-on or turn-off of the switch elements Q1~Q4 is switched by the switch controller 6, such that the direction of the voltage applied to the oscillation circuit 2 is inverted.

Moreover, in the third preferred embodiment, in order to reduce the switching loss or even achieve the zero voltage switch (ZVS), the above first threshold refers to a current value that allows a voltage of the third switch element Q3 or the first switch element Q1 when it is turned on to be equal or substantially equal to zero.

Fourth Preferred Embodiment

Figure 10:
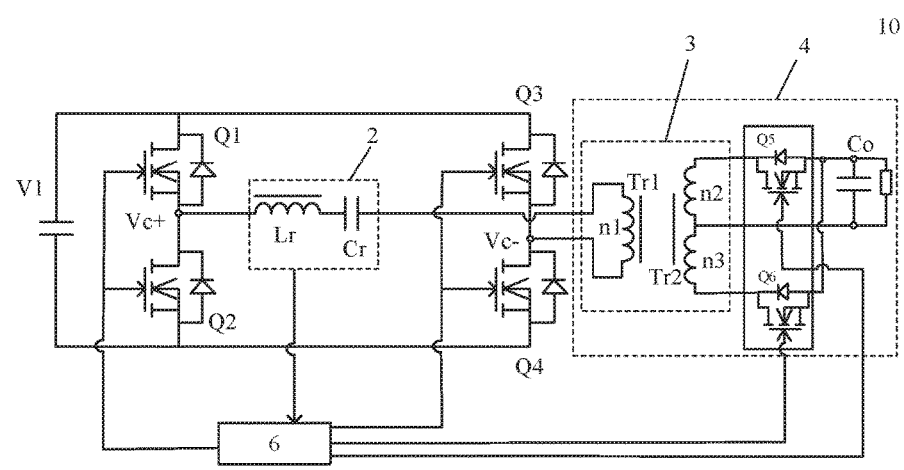
FIG. 10 is a block diagram illustrating a circuit structure of a DC/DC conversion apparatus 10 according to a fourth preferred embodiment of the present invention.

As described above, in the first to third preferred embodiments of the present invention, the rectification diodes D1 and D2 are preferably provided in the transformation circuit 4 of the DC/DC conversion apparatus 10. However, in the present field, since a loss will be generated when a rectification diode is turned on and turned off and a voltage drop of the rectification diode generally available in the market is usually about 0.7 V, the gain of the DC/DC conversion apparatus 10 of preferred embodiment of the present invention will decrease. With respect to this, since the voltage drop of a rectification switch is less than that of the rectification diode and a voltage drop of the rectification switch generally available in the market is usually about 0.1V. With the loss can be reduced with the rectification switch. With respect to this, the rectification diodes D1 and D2 may also be replaced by the rectification switches Q5 and Q6 as shown in FIG. 10 to more effectively achieve the requirement of reducing the loss.

Figure 9:
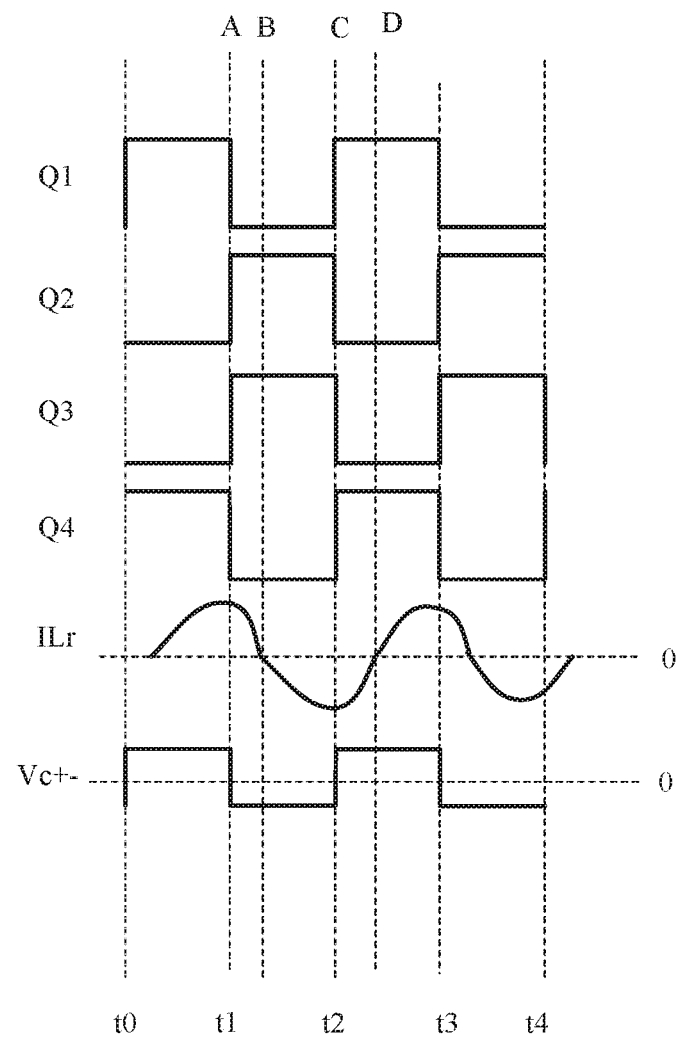
FIG. 9 is a diagram illustrating relationships between times at which individual switch elements Q1~Q4 are turned on/off, a current $I_{LLC}$ flowing through an oscillation circuit 20, and a voltage between a high potential side terminal Vc+ and a low potential side terminal Vc− of the oscillation circuit 20 in the prior art.

However, if a LLC full-bridge switching configuration in which duty cycles of the switches are each about 50% is provided, since after the time of the DC voltage source V1 imposing on the oscillation circuit 2 in the first direction has passed, the DC voltage source V1 will instantly impose on the oscillation circuit 2 in the second direction under the control of the switch controller 6. At this moment, with reference to time period A-B in FIG. 9, although the direction of the voltage Vc+− will vary within this time period, a direction of the current $I_{LLC}$ needs to be delayed to switch after time point B, i.e., a direction of a current in the oscillation circuit 2 needs to be switched after a period of time. Thus, in this case, if the diodes D1 and D2 are replaced by the rectification switches Q5 and Q6, only a current on the rectification switches Q5 and Q6 may be detected or a delay time after the switch elements Q1~Q4 are turned on/off may be estimated, and then, the rectification diode is turned on, which will make the control method become more complex and will increase a cost. With respect to this, synchronous rectification switches Q5 and Q6 may be synchronously turned on respectively when the switch element Q1 and the switch element Q3 are turned on and be synchronously turned off respectively when the switch element Q4 and the switch element Q2 are turned off. Since in the first to third preferred embodiments of the present invention, $I_{LLC}$ has been zero at this moment, the synchronous rectification switches Q5 and Q6 may be controlled in synchronization with Q1~Q4. The result is that the control becomes very simple and accurate.

Various variations may be made to preferred embodiments of the present invention without departing from the wide spirit and scope of the present invention. In addition, the above preferred embodiments are only presented as examples of the present invention, but do not limit or restrict the scope of the present invention. In other words, the scope of the present invention is defined by the claims, but not defined by the above preferred embodiments. Moreover, various variations implemented within the scope of the claims and the scope of their equivalences may also be considered within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A DC/DC conversion apparatus, comprising:
 a DC voltage source that outputs a DC power supply voltage;
 an oscillation circuit electrically connected to the DC voltage source;
 a plurality of switch elements;
 a switch controller that connects an electrical connection between the DC voltage source and the oscillation circuit and disconnects the electrical connection between the DC voltage source and the oscillation circuit during a time other than a dead-zone time, wherein the dead-zone time occurs when switching turn-on and turn-off of the plurality of switch elements, and switches a direction of a voltage applied to the oscillation circuit between a first direction and a second direction by switching turn-on and turn-off of the plurality of switch elements; and
 a transformation circuit that outputs a current generated in the oscillation circuit and converts the current into a DC current; wherein
 the switch controller disconnects the electrical connection between the oscillation circuit and the DC voltage source before the direction of the voltage applied to the oscillation circuit is switched from the first direction to the second direction, and connects the electrical connection between the oscillation circuit and the DC voltage source and switches the direction of the voltage applied to the oscillation circuit to the second direction after a current flowing through the oscillation circuit has been outputted to the transformation circuit.

2. The DC/DC conversion apparatus according to claim 1, wherein the switch controller connects the electrical connection between the oscillation circuit and the DC voltage source and switches the direction of the voltage applied to the oscillation circuit to the second direction, when the current flowing through the oscillation circuit has been outputted to the transformation circuit and then after passing through a specified latency.

3. The DC/DC conversion apparatus according to claim 2, wherein the switch controller disconnects the electrical connection between the oscillation circuit and the DC voltage source before the direction of the voltage applied to the oscillation circuit is switched from the second direction to the first direction, and connects the electrical connection between the oscillation circuit and the DC voltage source and switches the direction of the voltage applied to the oscillation circuit to the first direction after the current flowing through the oscillation circuit has been outputted to the transformation circuit.

4. The DC/DC conversion apparatus according to claim 3, wherein the switch controller connects the electrical connection between the oscillation circuit and the DC voltage source and switches the direction of the voltage applied to the oscillation circuit to the first direction, when the current flowing through the oscillation circuit has been outputted to the transformation circuit and then after passing through the specified latency.

5. The DC/DC conversion apparatus according to claim 3, wherein the switch controller connects the electrical connection between the oscillation circuit and the DC voltage source and switches the direction of the voltage applied to the oscillation circuit to the first direction before the current flowing through the oscillation circuit is outputted to the transformation circuit, such that a parasitic capacitance on a switch element being turned on when the direction of the voltage applied to the oscillation circuit is switched to the first direction is charged by a remaining portion of the current flowing through the oscillation circuit.

6. The DC/DC conversion apparatus according to claim 1, wherein the switch controller connects the electrical connection between the oscillation circuit and the DC voltage source and switches the direction of the voltage applied to the oscillation circuit to the second direction before the current flowing through the oscillation circuit is outputted to the transformation circuit, such that a parasitic capacitance on a switch element being turned on when the direction of the voltage applied to the oscillation circuit is switched to the second direction is charged by a remaining portion of the current flowing through the oscillation circuit.

7. The DC/DC conversion apparatus according to claim 1, wherein the plurality of switch elements include a first switch element, a second switch element, a third switch element, and a fourth switch element, in which:
- a connection point between the first switch element and the third switch element is connected with a positive side of the DC voltage source;
- a connection point between the second switch element and the fourth switch element is connected with a negative side of the DC voltage source;
- a connection point between the first switch element and the second switch element is connected with one terminal of the oscillation circuit; and
- a connection point between the third switch element and the fourth switch element is connected with the other terminal of the oscillation circuit.

8. The DC/DC conversion apparatus according to claim 7, wherein actions of turn-on or turn-off of the first switch element and the second switch element are opposite and actions of turn-on or turn-off of the third switch element and the fourth switch element are opposite within one cycle.

9. The DC/DC conversion apparatus according to claim 7, wherein time lengths of turn-on or turn-off of the first switch element and the third switch element are equal or substantially equal, time lengths of turn-on or turn-off of the second switch element and the fourth switch element are equal or substantially equal, and time lengths of turn-on of the second switch element and the fourth switch element are greater than time lengths of turn-on of the first switch element and the third switch element within one cycle.

10. The DC/DC conversion apparatus according to claim 7, wherein
- the first switch element is turned off and the second switch element is turned on when the first switch element and the fourth switch element are turned on and the second switch element and the third switch element are turned off, and the fourth switch element is turned off and the third switch element is turned on when the current flowing through the oscillation circuit is reduced to zero; and
- the third switch element is turned off and the fourth switch element is turned on when the second switch element and the third switch element are turned on and the first switch element and the fourth switch element are turned off, and the second switch element is turned off and the first switch element is turned on when the current flowing through the oscillation circuit is reduced to zero.

11. The DC/DC conversion apparatus according to claim 10, wherein an inductor is provided in the oscillation circuit and a first detector is provided on the inductor, the first detector detects a first current flowing through the inductor and the switch controller determines whether the first current is reduced to zero.

12. The DC/DC conversion apparatus according to claim 11, wherein
the transformation circuit includes a transformer, a primary side of the transformer being connected in series with the oscillation circuit, and a parasitic capacitance is provided at the primary side of the transformer; and
a second detector is provided on the primary side of the transformer, the second detector detects a second current flowing through the parasitic capacitance and the switch controller determines whether a difference between the first current and the second current is reduced to zero.

13. The DC/DC conversion apparatus according to claim 7, wherein
the first switch element is turned off and the second switch element is turned on when the first switch element and the fourth switch element are turned on and the second switch element and the third switch element are turned off, and the fourth switch element is turned off and the third switch element is turned on when the current flowing through the oscillation circuit is reduced to greater than zero and less than or equal to a first threshold; and
the third switch element is turned off and the fourth switch element is turned on when the second switch element and the third switch element are turned on and the first switch element and the fourth switch element are turned off, and the second switch element is turned off and the first switch element is turned on when the current flowing through the oscillation circuit is reduced to greater than zero and less than or equal to the first threshold.

14. The DC/DC conversion apparatus according to claim 13, wherein the first threshold refers to a current value that makes a turn-on voltage of the third switch element or the first switch element is equal or substantially equal to zero.

15. The DC/DC conversion apparatus according to claim 13, wherein an inductor is provided in the oscillation circuit and a first detector is provided on the inductor, the first detector detects a first current flowing through the inductor and the switch controller determines whether the first current is reduced to greater than zero and less than or equal to the first threshold.

16. The DC/DC conversion apparatus according to claim 15, wherein
the transformation circuit includes a transformer, a primary side of the transformer is connected in series with the oscillation circuit, and a parasitic capacitance is provided at the primary side of the transformer; and
a second detector is provided on the primary side of the transformer, the second detector detects a second current flowing through the parasitic capacitance and the switch controller determines whether a difference between the first current and the second current is reduced to greater than zero or less than or equal to the first threshold.

17. The DC/DC conversion apparatus according to claim 7, wherein a transformer is included in the transformation circuit, synchronous rectification switches are connected at two terminals of a secondary side of the transformer, respectively; and
the synchronous rectification switches are turned on respectively when the first switch element and the third switch element are turned on, and turned off respectively when the fourth switch element and the second switch element are turned off.

* * * * *